(12) United States Patent
Neal et al.

(10) Patent No.: US 7,216,464 B2
(45) Date of Patent: May 15, 2007

(54) MODULAR OVEN WALL PANEL ASSEMBLY

(75) Inventors: Greg Neal, Kennesaw, GA (US); David Neal, Marietta, GA (US)

(73) Assignee: Raypaul Industries, Inc., Marietta, GA (US)

(*) Notice: Subject to any disclaimer, the term of this patent is extended or adjusted under 35 U.S.C. 154(b) by 59 days.

(21) Appl. No.: 10/903,479

(22) Filed: Aug. 2, 2004

(65) Prior Publication Data

US 2005/0133016 A1 Jun. 23, 2005

Related U.S. Application Data

(60) Division of application No. 10/265,475, filed on Oct. 7, 2002, now Pat. No. 6,905,332, which is a continuation of application No. 09/645,526, filed on Aug. 25, 2000, now abandoned.

(51) Int. Cl.
F27D 1/00 (2006.01)
F27B 17/00 (2006.01)
A21B 1/00 (2006.01)

(52) U.S. Cl. .............. 52/584.1; 52/794.1; 52/800.12; 126/19 R; 126/64; 126/273 R; 110/336; 432/247

(58) Field of Classification Search ........... 52/792.1, 52/794.1, 784.15, 584.1, 800.12, 309.9, 406.2; 110/336; 126/64, 65, 19 R, 273 R
See application file for complete search history.

(56) References Cited

U.S. PATENT DOCUMENTS

| | | | | |
|---|---|---|---|---|
| 1,826,114 A | * | 10/1931 | Young | 52/793.11 |
| 1,919,780 A | * | 7/1933 | Fairbank | 52/584.1 |
| 2,311,908 A | | 2/1943 | Vranken | |
| 2,585,082 A | * | 2/1952 | Bollinger, Jr. | 52/576 |
| 2,647,287 A | * | 8/1953 | Jones | 52/582.2 |
| 2,836,266 A | * | 5/1958 | Leeser | 52/578 |
| 2,856,172 A | | 10/1958 | Kautz | |
| 3,070,196 A | * | 12/1962 | Switzgable, Jr. | 52/404.4 |
| 3,252,262 A | * | 5/1966 | Jessen | 52/784.14 |
| 3,353,314 A | * | 11/1967 | Melcher | 52/127.9 |
| 3,455,078 A | * | 7/1969 | Brown et al. | 52/784.13 |
| 3,786,613 A | * | 1/1974 | Shepheard | 52/784.13 |
| 3,977,824 A | | 8/1976 | Korting et al. | 432/251 |
| 3,990,203 A | | 11/1976 | Greaves | 52/581 |
| 4,008,745 A | * | 2/1977 | Bailey | 160/229.1 |
| 4,198,951 A | | 4/1980 | Ellison et al. | 126/273 R |

(Continued)

OTHER PUBLICATIONS

RayPaul Industries, Inc., 3 pages, Modular gas fired systems—one page illustration with text and two pages of photos entitled Over/Under Pole/Belt Drying Oven and Flat Line Curving Ovens, not dated.

(Continued)

Primary Examiner—Robert Canfield
(74) Attorney, Agent, or Firm—Smith, Gambrell & Russell LLP

(57) ABSTRACT

A modular oven, such as a batch process oven, includes a standardized set of self supporting, interconnectable panels which, when assembled, from a self-supporting heat containment shell, free of added structural support members. The present invention is also directed at self-supporting modular oven panels and a method of assembling the panels such as in the expansion or conversion of a first modular oven assembly to a second assembly more conducive to current production requirements.

19 Claims, 16 Drawing Sheets

U.S. PATENT DOCUMENTS

| | | | |
|---|---|---|---|
| 4,245,615 A | 1/1981 | Moss | 126/273 R |
| 4,246,852 A | 1/1981 | Werych | 110/336 |
| 4,249,888 A | 2/1981 | Werych | 432/247 |
| D258,886 S | 4/1981 | Gaskins | |
| 4,297,940 A | 11/1981 | Hainline | 98/33 R |
| 4,300,882 A | 11/1981 | Werych | 432/247 |
| 4,311,460 A | 1/1982 | Lauersdorf et al. | |
| 4,336,443 A | 6/1982 | Benedetto | 219/400 |
| 4,366,177 A | 12/1982 | Wells et al. | 99/443 C |
| RE31,461 E * | 12/1983 | Martin et al. | 29/525.01 |
| 4,571,915 A * | 2/1986 | Barman | 52/784.11 |
| 4,733,481 A | 3/1988 | Hubbert | 432/147 |
| 4,764,108 A | 8/1988 | Carthew et al. | 432/247 |
| 4,918,895 A | 4/1990 | Landheer | 52/580 |
| 4,919,109 A | 4/1990 | Riley | 126/65 |
| 4,951,645 A | 8/1990 | Luebke | 126/20.1 |
| 5,025,570 A | 6/1991 | Moffat | 34/72 |
| 5,277,105 A | 1/1994 | Bruno | 99/443 C |
| 5,303,660 A | 4/1994 | Lauersdorf | 110/336 |
| D360,423 S | 7/1995 | Neal | |
| 5,448,872 A * | 9/1995 | Thompson et al. | 52/784.13 |
| 5,466,150 A | 11/1995 | Albersdorfer et al. | 432/192 |
| 5,475,958 A | 12/1995 | Josefsson | |
| 5,533,312 A * | 7/1996 | Mihalcheon | 52/309.9 |
| 5,594,999 A | 1/1997 | Best | 34/270 |
| 5,619,613 A | 4/1997 | Otaki | 392/437 |
| 5,619,911 A | 4/1997 | Voegtlin | 99/443 C |
| D393,978 S | 5/1998 | Grant | |
| D393,979 S | 5/1998 | Grant | |
| 5,767,492 A | 6/1998 | Pinceloup | 219/699 |
| 5,826,496 A | 10/1998 | Jara | 99/443 C |
| 5,875,705 A | 3/1999 | Knost | 99/443 C |
| 5,964,044 A | 10/1999 | Lauersdorf | 34/224 |
| 6,119,427 A * | 9/2000 | Wyman et al. | 52/584.1 |
| 6,321,505 B1 * | 11/2001 | Packman et al. | 52/784.13 |
| 6,394,794 B2 | 5/2002 | Bloom et al. | 432/128 |
| 6,905,332 B1 * | 6/2005 | Neal et al. | 432/247 |

OTHER PUBLICATIONS

RayPaul Manufacturing Presents the Cyclone, 5 pages, (estimated 1994) based on domestic sheet.

Brochure—Standard Batch Oven(s) for Thermo King, 2 pages, not dated.

Brochure—RayPaul Industries Inc., New, from the pioneers of gas-fired screrenprint drying . . . , 4 pages (Vulcan, Cureair and Elite products), not dated.

Brochure—Vulcan, Energy Efficient Expandable Modular Design, 6 pages, not dated.

* cited by examiner

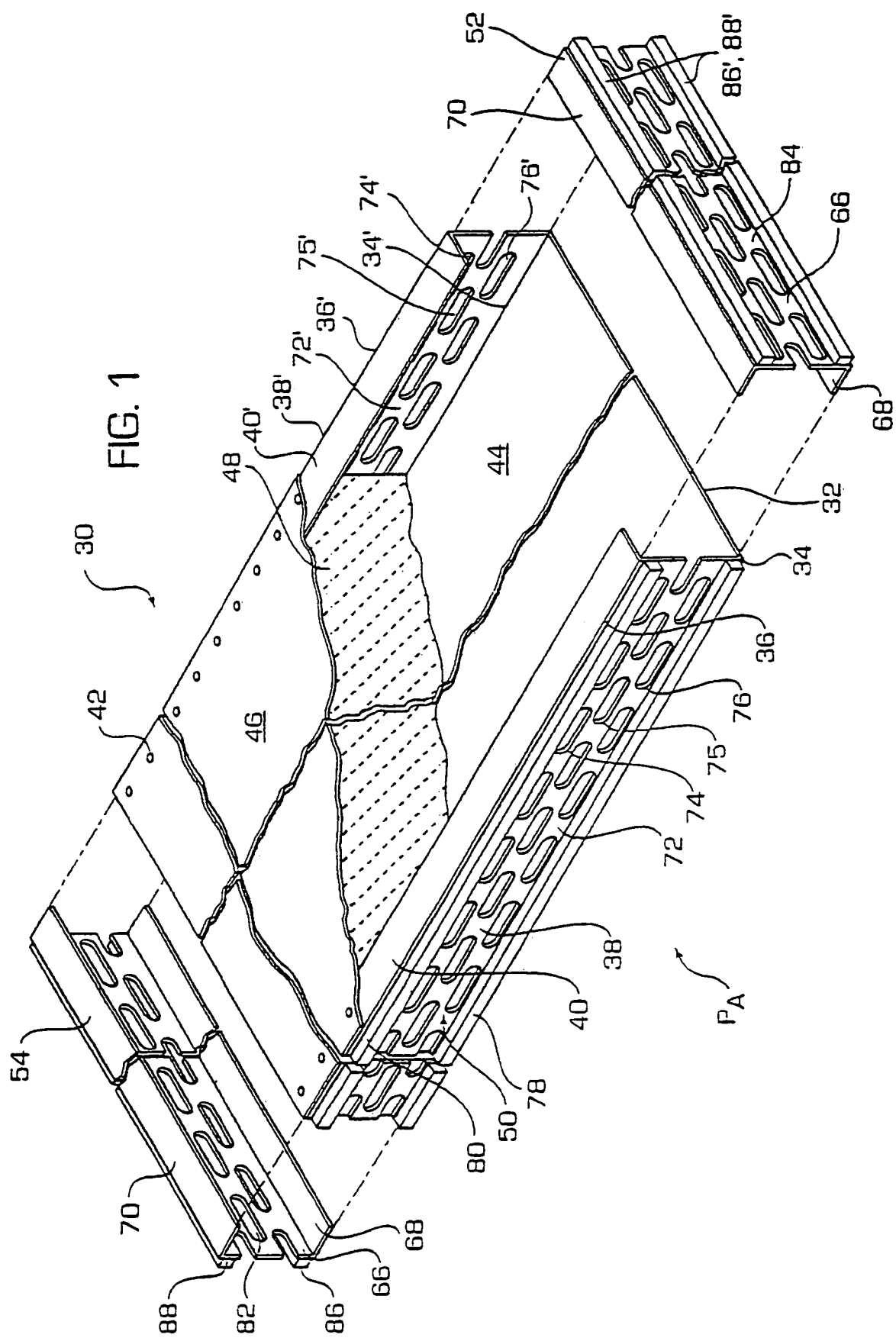

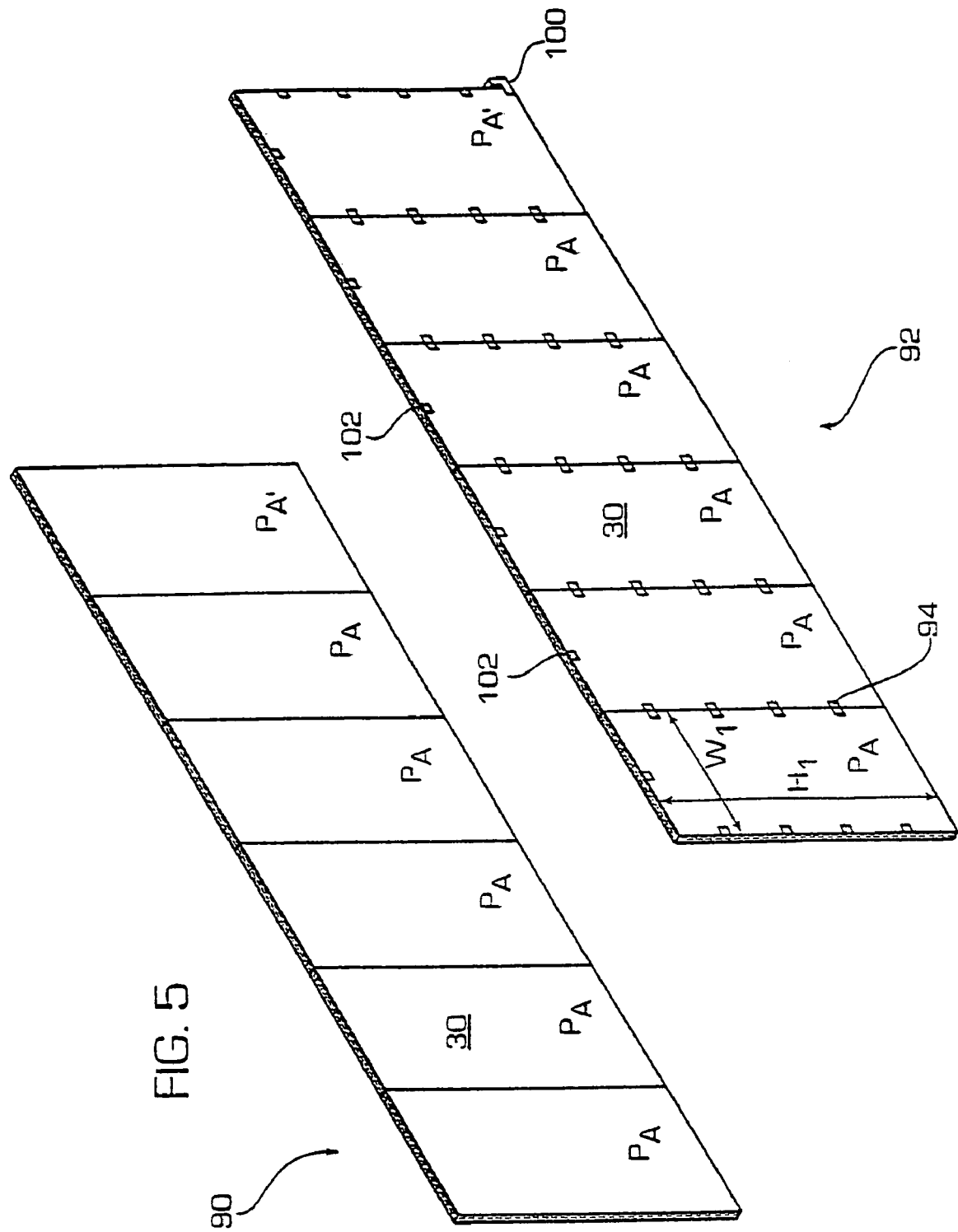

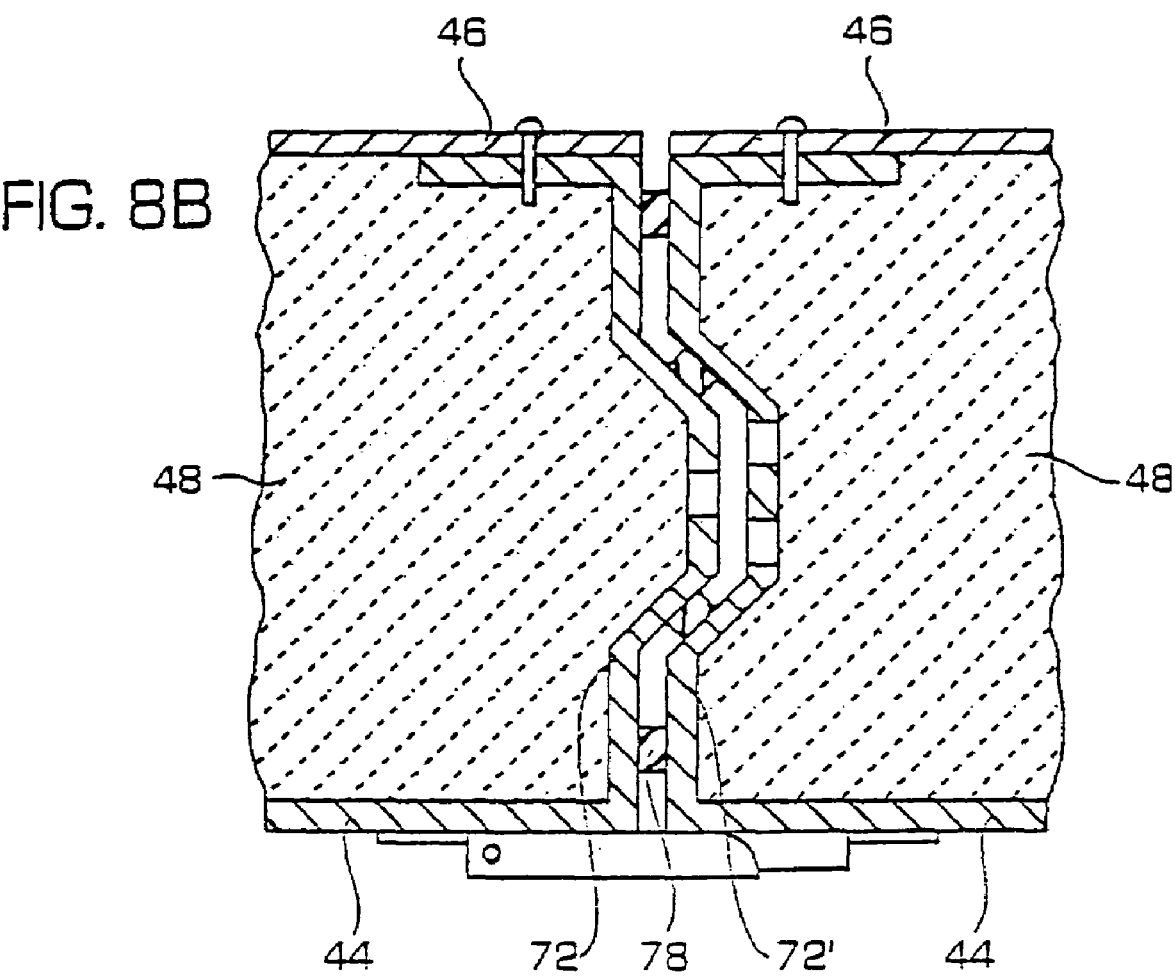

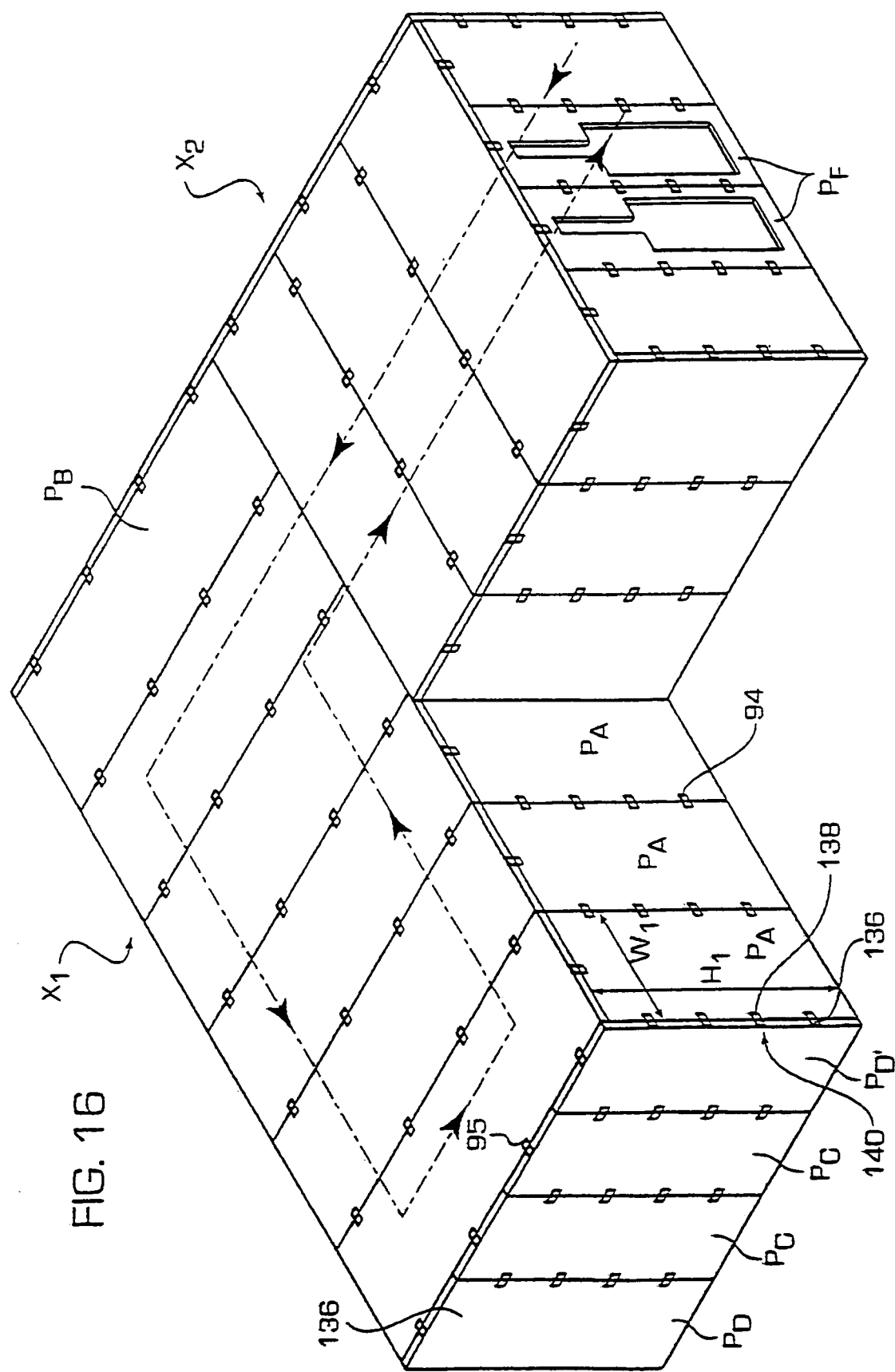

MODULAR OVEN WALL PANEL ASSEMBLY

The present application is divisional of Ser. No. 10/265,475, filed Oct. 7, 2002 now U.S. Pat. No. 6,905,332, which is a continuation of Ser. No. 09/645,526, filed Aug. 25, 2000 now abandoned, and which are incorporated herein by reference in their entirety.

FIELD OF THE INVENTION

The present invention is directed at a modular oven, such as a batch process oven, comprised of a standardized set of self supporting, interconnectable panels which, when assembled, from a self-supporting heat containment shell, free of added structural support members. The present invention is also directed at self-supporting modular oven panels and a method of assembling the panels such as in the expansion or conversion of a first modular oven assembly to a second assembly more conducive to current production requirements.

BACKGROUND OF THE INVENTION

Conventional heat treatment processes, such as a batch oven heat treatment process and other heat treatment process techniques, involve prior art ovens that have been constructed from custom designs. These custom designs often involve custom components such as odd sized insulated panels of a standard tongue and groove construction with raw metal edges. Ductwork, for hot air distribution in these prior art ovens, is usually custom fitted into the oven structure so as to allow for even distribution of hot air for the designed application. Walls are then trimmed internally and externally using rows of fasteners through cosmetic as well as structural angular trim pieces, giving the structure permanency. The permanent structure is then supported using structural steel such as "T" beam, "C" channel, and tie angle to provide a skeletal framework for the shell to rest on or against. U.S. Pat. Nos. 3,977,824; 4,246,852; 4,249,888; 4,311,460; 4,764,108 and 5,475,958 are representative of prior art oven or furnace structures relying on additional frame structures to support their panels or walls.

The degree of custom construction associated with conventional heat treatment ovens and the like lends itself to limitations as to future adaptability of components when attempting to alter the structure to accommodate changes in the end user's needs as each different structure commonly requires further customization of fabricated framework, ductwork, and shell to achieve the new size and/or functionality requirements.

An example of such limitations can be seen in the requirements involved following investment in a batch process oven during a business' early years, when production quantities are relatively small. With increased production needs, the process of heat treating (baking, drying, etc.) usually graduates from small batch runs to some form of automated conveyance of a product. The customized structural components cannot effectively be recouped or reapplied to future oven structures because the cost to change or modify the structure becomes prohibitive.

U.S. Pat. No. 4,198,951 describes forming an oven roof or wall from modular panels, each of which comprises an inner fabric and an outer fabric, with each fabric formed with an angle iron framework and somewhat resilient tie bars welded at their ends to the angle iron framework. The skins are formed so as to have one skin project laterally over an adjacent skin so as to slidingly overlie therewith to accommodate expansion contracture. These modular panels of U.S. '951 are highly labor intensive in their manufacture and provide a panel not easily erected, particularly in the roof panel/slide panel interface or at sidewall corners.

U.S. Design Pat. No. D360,423 to the assignee of the present application, RAYPAUL Industries, is directed at a design for a screen print curing oven. The illustrated curing oven features latched curing oven panels which latches provides for rapid assembly and disassembly, but like the prior art, is at least partially supported by a (conveyor) frame structure and does not feature a stand alone modular panel. Accordingly, the oven in design D360,423 lacks the flexibility of the present invention.

U.S. Pat. No. 4,336,443 is directed at a modular bake oven for drying varnished electrical components, which includes a front oven section forming one-half of the top and side walls of the assembled oven and a rear oven section forming the other half. While providing an oven that can be readily assembled and disassembled, the components of the oven fail to provide a high degree of freedom in accommodating variations in usage requirements.

SUMMARY OF THE INVENTION

The present invention is directed at providing a modular oven that is formed of individual, self-sustaining or self-supporting panels that can be efficiently produced and rapidly assembled and disassembled, and designed to accommodate the expansion, contraction and heat retention characteristics associated with modular ovens such as those described herein. In addition to being easy to assemble and disassemble, the present invention also provides a modular oven and modular oven components that provide a high degree of versatility and freedom in the expansion, contraction or conversion of a present oven design to a new design that better conforms to current production requirements of the oven.

The present inventions provides a modular oven which features standardized components that can be reutilized more effectively when production needs increase or change which results in significant capital cost savings. For example, in accordance with the present invention, significant efficiencies and versatility enhancements are provided by eliminating the need for a structural framework and by providing higher standardized components that can be readily added or subtracted with respect to a preexisting shell during relocating and/or rearranging of the existing shell.

The modular oven of the present invention allows for reutilization of components such as insulated panels, ductwork components and control components by providing a self-supporting shell that is engineered to reutilize standardized panels and eliminate the structural support members by incorporating all necessary structural material into the shell components. The shell components feature standardized, modular designs by having the basic structural characteristics of one shell component conform to that of the others in the oven structure including those in different areas of the oven such as the roof side walls, end walls, and preferably also in the heater-blower encasement, etc. Further, any required differences such as size and location of heat dissipating holes are further standardized within standardized sub-groups of the general common structural characteristics of the shell components. Thus, the present invention makes reutilization of standardized components achievable when expanding or converting those components into a structure more conducive to new production requirements. Moreover, additional components can be easily added or exchanged with additional or optional components such as by making a few minor present shell component alterations and then adding on additional standardized components. In this way, there is a large degree of reutilization of original shell components by allowing existing components to be reused when redesigning the process to accommodate automated conveyance, for example. In addition, the arrangement of the present invention even allows for a contraction of the modular oven to accommodate for periods of decreased production requirements through removal of the standardized components and repositioning of preexisting components with the removal components being readily available for use in a different production requirement or readily stored for reuse upon another increase in production requirements for a particular product for the base form of the present invention.

The modular oven assembly of the present invention preferably utilizes standardized, self-supporting, insulated panel assemblies having a common structural attribute of inner and outer (preferably a metal such as stainless steel) shell sections with the outer shell section being represented by a generally "C" shaped cross-sectioned structure derived from the outer shell section material being bent into a standardized configuration. Each outer shell section is preferably formed by bending so as to feature sections that define an outer face, two peripheral edge segments extending perpendicular to the respective opposing face edges and two inner support flange segments each extending perpendicularly off a respective edge segment and inward toward each other so as to be parallel to the face and so as to complete the C-shape cross-section. The inner shell section is preferably in the form of a planar metal sheet joined along its long edges to the support flange segments.

The bend lines are preferably provided along the longest length of the original sheet of material being bent into the C-shaped cross-section configuration. Thus, the bends formed between the face and edge segments of the panel's outer shell section represent the edges at each long side of the outer shell section face, while the edge segments of the outer shell section provide means for separating the inner shell section panel from the outer face of the combined inner and outer shell sections to achieve a combined inner and outer shell section assembly. The two inner flange segments provide a lip support region for securement of the inner shell section. Preferably the inner shell section is in the form of a planar, unitary solid metal sheet or plate that is fastened to the "C" shaped structure with, for example, a series of fasteners (e.g., rivets), along the inner shell section's long sides. In a first standardized panel, each of the two peripheral edge segments of the outer shell section (derived from a bending of an initial flat sheet of shell material along two parallel lines and representing the separation of the inner and the outer shell sections) is preferably perforated to allow for the dissipation of heat to the outer shell section from the inner shell section and to a controlled external dissipation area external to the panel through conduction and convection once the inner skin is heated.

Each end of the resulting box structure formed by the combined inner and outer shell sections is capped off with a perforated (or non-perforated for non-covered edges) end cap channel that is preferably formed by bending a sheet of material that is the same as that used for the outer shell section or, more preferably, of a thinner material such as that used on the inner shell section, or even thinner as the C-shaped shell section and inner shell section provide a self supporting shell section. The end cap channel is formed by bending a sheet of material so as to have an intermediate area and two side or leg walls so as to define a U-shaped channel end cap. The channel end cap is preferably attached to the interior free end surface of the combined inner and outer shell sections with a series of fasteners or by some other fastener means. During or after the assembly process the panel is essentially filled (more than 90°) with a suitable insulation to better control the heat transfer from the inner to the outer skin so as to avoid having the external surface becoming too hot for operator contact.

In a preferred embodiment, in addition to a first set of standardized base panels with the two channel end caps having heat dissipation perforations and the two edge segments having heat dissipation perforations, additional standardized panel structures are provided similar to the first, except for variations in the selection of the perforated/non-perforated state for the channel end caps and the perforated/non-perforated state for the outer shell sections edge segments, as well as in the providing of peripheral perforated heat dissipation regions in the inner shell section for those regions where an adjacent outer shell section's edge segment or channel end cap has a non-perforated status.

In a preferred embodiment, at least some of the perforated channel end caps and perforated edge segments are fitted with a suitable gasket material with a preferred arrangement featuring inner and outer seal strips arranged parallel on opposite sides of an intermediate perforation region (preferably a solid region is provided on each side of the channel end cap or edge segment between the perforated region and prior to the bends to provide a seal support region). The seal strips thus prevent the hot air from inside the assembled structure from escaping to the exterior of the assembled structure, while allowing for the perforation holes to perform their heat dissipation function.

A modular oven is easily constructed through use of the standardized, self-supporting panels of the present invention, by placing multiple panels together and then latching them into position. The insulated panels forming, for example, the roof or sidewalls, are slid together forming a seal between each panel when a gasketed edge meets an un-gasketed edge. At each joint, panels are then secured together with the latches (outer wall latches being sufficient although inner and outer wall latching is an alternate embodiment of the invention) lock each panel firmly against the next with the seals being in a state of compression, but with the seals retaining some degree of compression room to accommodate for panel expansion.

This assembly process generates a self supporting structure or oven shell. Benefits of the present invention include the ability to secure the panels quickly without hollow cavities that must be insulated prior to connecting one panel to another as with current tongue and groove methods. Oven shell assembly thus becomes more effortless in the absence of a separate structural support framework requirement as in the prior art, as the shaped panels of the present invention in and of themselves provide adequate support for roofs, walls, etc. The oven shell structure is not permanent as it is constructed of standardized panels and components which can be reused in future structures or expanded with additional components or by the relocation or rearranging of existing components.

The standardized components making up the oven can be made to provide for various optional accesses (product or operator). For example, a single or a double set of doors to provide access during a batch type process where parts are conveyed by hand into and out of the oven shell by means of opening and closing the door can be provided that are readily attachable to preexisting components either by expansion or replacement of a preexisting component. Alternatively, a product access opening can be formed in one or more select panels (e.g., a modular panel with a profiled opening wherein parts are conveyed into and out of the oven shell structure by an overhead conveyor or trolley at a timed interval). Thus, either a door or profile panel structure can be provided for gaining oven access and the door or profiled panels are standardized in size to fit the oven shell structure at one or both ends or a side of the oven depending on the conveyance method required by the end user's production needs.

The assembled oven shell structure further provides support to a blower to recirculate heated air and a burner to facilitate the heating of that air which is connected via a duct arrangement for either a sidewall panel or a roof panel as well as an exhaust duct.

The walls and roof panels are assembled into a tunnel length suitable to provide adequate area for the needs of the end user with the ends closed with any of several options such as a completely sealed off end of a hinged door panel or a panel with a hole conforming to a combination conveyor/product therethrough.

Additionally, more burner and blower sections can be positioned along the tunnel top or side as needed and in any quantity necessary to adequately distribute heated air along the tunnel's length.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a cut-away, exploded view of a first embodiment of a standardized panel assembly of the present invention, particularly well suited for oven side wall construction.

FIG. 5 shows a perspective view of a plurality of connected, standardized panels assembled together to form two vertical side walls of a modular oven being assembled.

FIGS. 8A and 8B show alternate embodiments of a panel shell assembly having added male/female bends formed in the perforated long sidewall.

FIG. 16 shows a perspective view of an expanded modular oven with product conveyer track.

DETAILED DESCRIPTION OF THE PREFERRED EMBODIMENTS

Figure 2A:
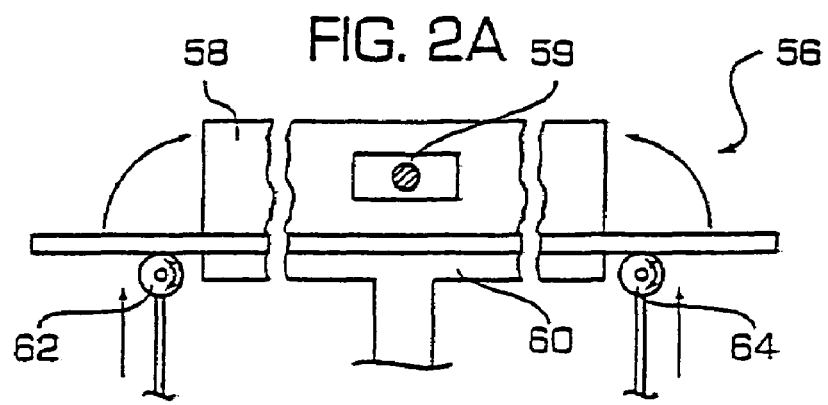
FIGS. 2A, 2B and 2C illustrate schematically the formation of bends in the outer shell section of a standardized modular panel.

FIG. 1 provides a partially exploded cut away view of panel assembly 30 of the present invention. As shown in FIG. 1, panel assembly 30 comprises outer shell section 32 which, in a preferred embodiment features a single sheet of panel material that is bent on a first side along a first bend line 34 extending along the long length of the sheet and then along a second parallel bend line 36. The same bend arrangement is provided on the opposite side as represented in FIG. 1 by corresponding bend lines 34' and 36'

Between respective bend line pairs 34–36 and 34'–36' is formed peripheral edge segments 38 and 38'. First support flange section 40 extends inwardly from bend edge 36 and second support flange section 40' extends inwardly to complete the C-shaped cross-section for outer shell section 32. As shown, peripheral edge segments 38 and 38' extend transversely off from facing 44 of the outer shell section 32 and flange sections 40, 40' extend inwardly toward each other and parallel to face 44. Flange sections 40 and 40' each extend inwardly a sufficient distance to provide a supporting platform and added strength to the overall shell assembly (e.g., an inch or two for every two feet of facing 44 length), while edge sections 38 and 38' extend a sufficient distance to provide room for dissipation channels and supporting surfaces for sealing material to opposite sides (e.g., about three inches for every two feet of facing 44 length (e.g., 2 feet of facing length, 3 inch edge segments and 1 inch flange support section). A preferred material for outer shell section is 20 gauge steel (i.e., 0.92 mm thick) with a powder coated (e.g., powder paint material) exterior surface finish. The C-shaped cross section for outer shell 32 provides for a high strength panel section, which is further strengthened upon the addition of inner shell section 46, as described below.

Inner shell section 46 is secured to flange support sections 40, 40' by suitable securement means such as by way of fasteners 42 (e.g., rivets, spot welds or the like). Prior to attachment of inner shell section 46 to flange support sections 40, 40' insulation pad 48 of for example, mineral wool or fiber glass, or the like is placed into position. Alternatively, insulation 48 can be slid into one of the open ends of the C-shaped cross-sectioned outer shell 32, following securement of inner shell section 46. Inner shell section 46 is preferably in the form of a 20 gauge sheet of steel material with an aluminized interior oven surface. The heat exposed surface face of inner shell section 46 (the surface face opposite to that supported by flange support sections 40 and 40') represents the modular oven interior surface of the panel assembly 30. Thus, the combination of inner and outer shell sections 32 and 46 represents shell assembly 50, while panel assembly 30 comprises the combination of shell assembly 50, the insulation pad 48 and the below described end caps 52 and 54. As represented in FIG. 1, first end cap 52 is attached to one of the two ends of shell assembly 50 while second end cap 54 is attached to the remaining end of shell assembly 50.

Figure 2B:
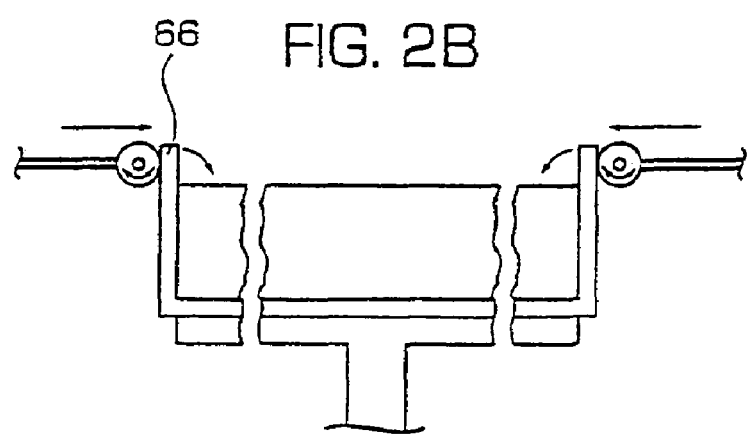
Figure 2C:
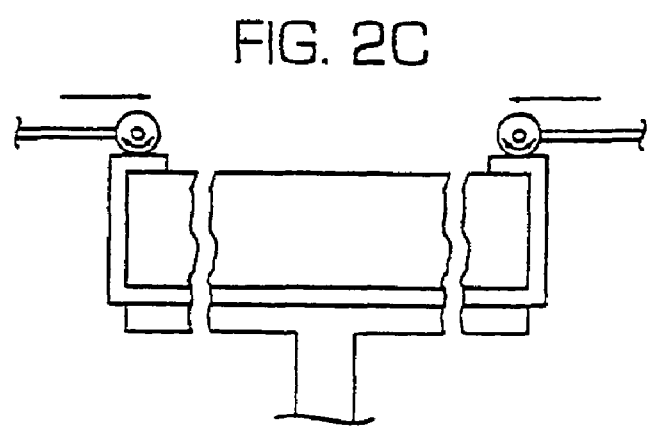

As shown in FIGS. 2A to 2C, outer shell section 32 can be rapidly formed through use of, for example, compression die assembly 56 which includes upper die block 58 and, in this embodiment, an underlying compression dieplate 60 for fixing an intermediate portion of the sheet of material being bent, while a pair of manipulated pressure rollers 62 and 64 (with the help of hydraulics or the like) first bend the single sheet of material so as to compress against the side wall of the blocks so as to partially define the edge segments (FIG. 2B) and then bend the sheet 66 extension shown in FIG. 2B against the top edges of the die block to complete the C-shaped cross sectioning as shown in FIG. 2C. The die and C-shaped shell sections are then separated (e.g., movement of upper die plate 58 horizontally by way of shaft 59 and vertical adjustment of plate 60.

End caps 52 and 54 are preferably channel shaped members that are U-shaped in cross-section with each having intermediate portion 66 and legs 68 and 70. The end caps can be formed in a similar fashion as represented in FIGS. 2A and 2B with a different shaped upper die block and lower die plate. Legs 68 and 70 have external surfaces which are separated a distance sufficient for sliding friction reception within the respective free ends of the C-shaped outer section when the members are at ambient temperature. That is, in a sliding friction contact relationship with the interior surface of flanges 40, 40' and face 44. Once installed, intermediate portion 66 represents the exterior peripheral face for the shorter sides of the panel assembly 30 in similar fashion to the manner in which edge sections 38 and 38' define the exterior peripheral faces of the longer sides of panel assembly 30. In one preferred embodiment, the intermediate portion 66 is arranged so as to be on a common plane lying flush with respect to the adjacent free edges of the C-shaped crossed sectioned outer section 32. Also, interior shell section or inner plate 46 is preferably arranged so as to have its exterior peripheral edge commensurate with the corresponding edges of the outer section so as to have no exposed free edges.

FIG. 1 further shows a first embodiment of base panel 30 wherein each of edge sections 38 and 38' include an intermediate region 72 of heat dissipation passage apertures (region 72' on the opposite edge section). In a preferred embodiment, each of regions 72, 72' includes three rows of offset elongated apertures 74, 75 and 76 (74', 75' and 76') that extend generally for the fill length of the edge sections and for more than a majority of the width of the edge section and preferably for about ⅔ of the width (e.g., within ½ to 1 inch of the bend edges of the edge sections) as shown in FIG. 1. In addition, in the embodiment shown in FIG. 1, each of the end caps have the same perforation pattern as in the edge sections. Also, as shown in FIG. 1, there is provided a solid (unperforated) region running along adjacent the length of perforation region and to each side thereof. On each of the two parallel extending solid regions of at least one edge segment there is secured sealing strips 78 and 80. The sealing strips also run for essentially the full length of the edge section in the same way as the perforations extend essentially from end to end (within an inch of a free edge). On each of the end caps 52 and 54 there is also provided a similar elongated intermediate series of heat dissipation passage regions 82, 84 and sealing strips (unless already present on an abutting panel) identified 86, 88 (86' and 88').

Panel assembly 30 in FIG. 1 is representative of a preferred base panel $P_A$ (See FIGS. 1 and 5) which is well suited, as explained in greater detail below, for use as a vertically oriented side wall component of a modular oven. FIG. 5 shows some completed initial steps undertaken to form an industrial modular oven with there being shown two vertical modular oven walls 90 and 92 which in this embodiment are each made of, for example, five, 2 foot width (W1) panel assemblies 30 which, in this embodiment, are 8 feet high ($H_1$) and have 3 inch width end channels with a lower end channel in contact with the ground (preferably with the seal strips supported by the bottom end channel compressed against the underlying supporting surface, although solid or a perforated end cap without strips represents alternate embodiments of the invention) and with the other end channel representing the top of the side wall unit $P_A$. Although the panel's temporary supports will facilitate manual assembly of the vertical sidewalls to preclude tipping on, for example, a flat concrete underlying support surface or horizontal flooring panels. Slots formed in a floor can also be utilized with the panels of the present invention.

Figure 6:
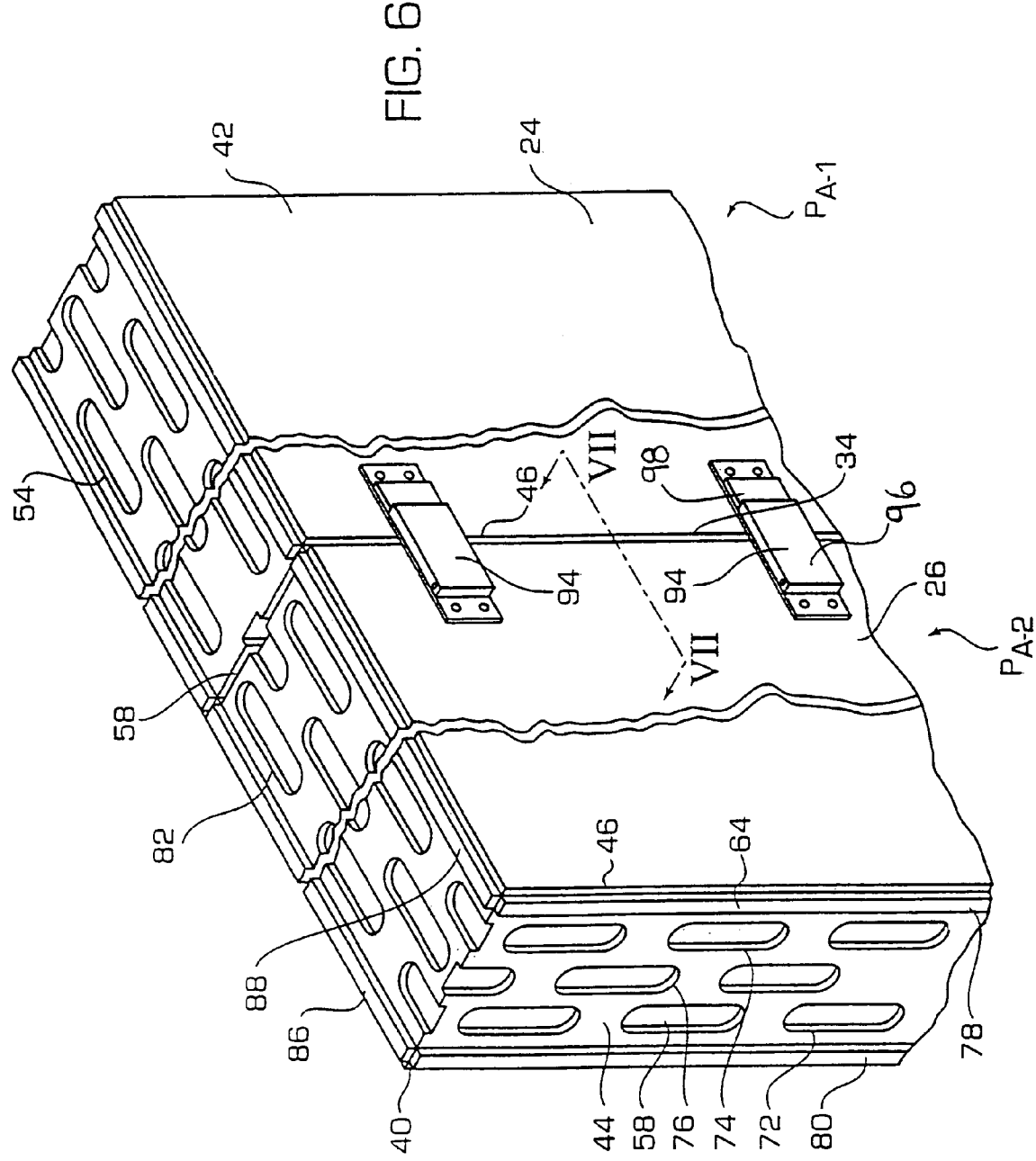
FIG. 6 shows an enlarged, cut-away view of two interconnected panel assemblies in FIG. 5.
Figure 7:
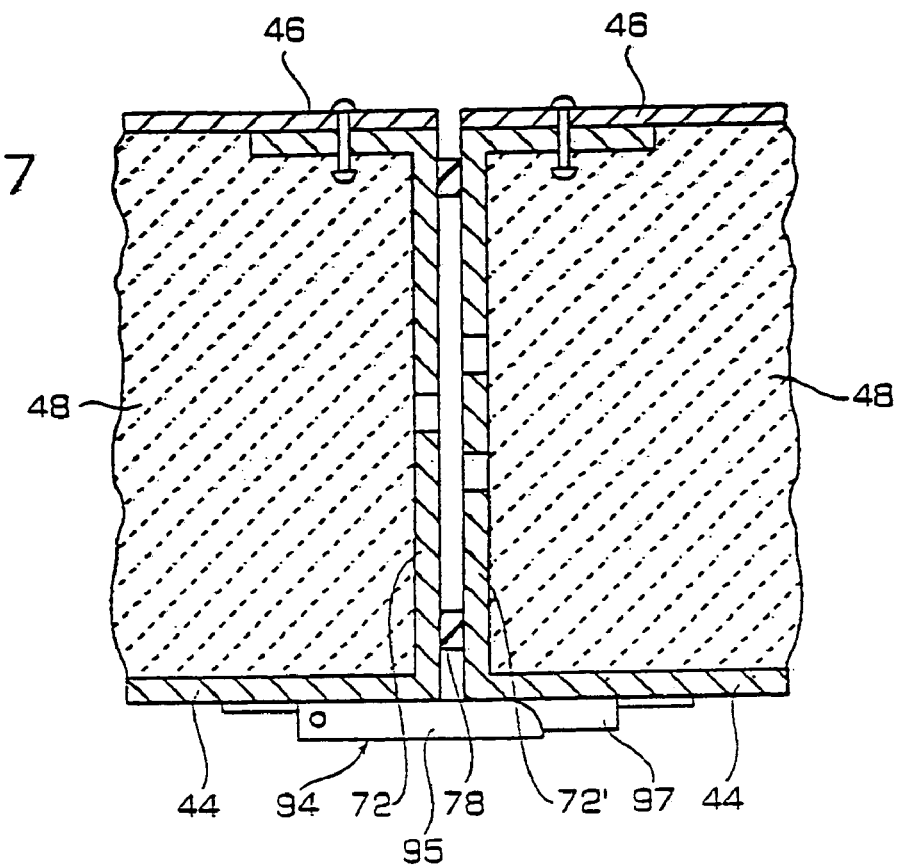
FIG. 7 shows a cut-away view taken along cross-sectional line VII—VII in FIG. 6.

With reference to FIGS. 5, 6, and 7, there can be seen the sealing and clamping arrangement used for interconnecting the 5 panels $P_A$ so as to form respective vertical side walls 90 and 92.

As shown in FIG. 7, between two panel abutting edge segments $P_A$–$P_A$, there is compressed a single sealing strip layer comprised of sealing strips (78 and 80) to opposite sides of the heat dissipation passage apertures intermediate region 72. Thus, each abutting panel assembly need not be provided with sealing strips on all of its abutment edges, although variations are possible such as thin width seal strips that are provided on each abutting panel but laterally offset for a direct side to side contact, or two aligned seal strips that are in direct compression contact, etc. As further shown in FIGS. 6 and 7, adjacent panel assemblies $P_{A1}$ and $P_{A2}$ are clamped together so as to compress the sealing means therebetween while leaving some degree of additional compression available in the seal material to accommodate high temperature expansion of the panels. For example, a 4 to 5 mm thick seal strip formed of high temperature silicone sponge) material is compressed to about ⅓ its uncompressed thickness with a further compression of its original uncompressed thickness being provided for accommodating panel heat expansion. Preferably the panel fastening clamps 94 are in the form of two piece over-center clamps, similar to ski-boot clamps, with the pivoting component 96 secured to one of the two adjacent panel assemblies such as $P_{A1}$ and $P_{A2}$ and the fixed securement member 98 fixed to the opposite panel assembly at a common vertical height location. Each or both of the latch components can be provided with compression and expansion accommodation means (not shown) such as a compressible biasing member (e.g., a rubber pad) associated with either a latch lock bar or latch articulation bar. There is required to be a sufficient number of clamps along the long length of the panel assemblies (e.g., on the outer facing 44 of the panel assembly along the length of the edge section) so as to provide for adequate and generally equal compression levels along the entire length of the panel assemblies. A single clamp for every 1 to 2 feet of panel length is typically suitable for satisfying clamping and generally equal compression levels. In a preferred embodiment featuring a 8 foot high side wall 4 clamps are provided at, for example, 1.5 to 1.75 feet spacing with clearance (e.g., at least 6 inches) at the top and bottom.

FIG. 7 further illustrates that the two adjacent perforated regions (72 in one panel and 72' of the adjacent panel assembly) are separated from one another by way of the intermediate strips (78, 80) so as to form central dissipation channels that are in flow communication with other channels along the panel assemblies' peripheries (e.g. a common channel along a vertical edge section and leading to horizontal channels along the end cap channel for the same panel and an adjacent panel). Thus, heat flow is provided for to help dissipate heat in the hotter regions through heat flow distribution through the heat dissipation apertures and channels to the cooler regions.

FIG. 7 also illustrates insulation pad 48 for the panels provided between the interior wall 46 and the exterior facing or wall 44. The insulation pad 48 in FIG. 7 is shown as being a full fill volume pad although other arrangements are possible such as providing dead air spacing as well as a laminated pad arrangement of different types of insulation such as a more heat resistance internal insulation laminate and a less heat resistant outer layer.

Figure 8A:
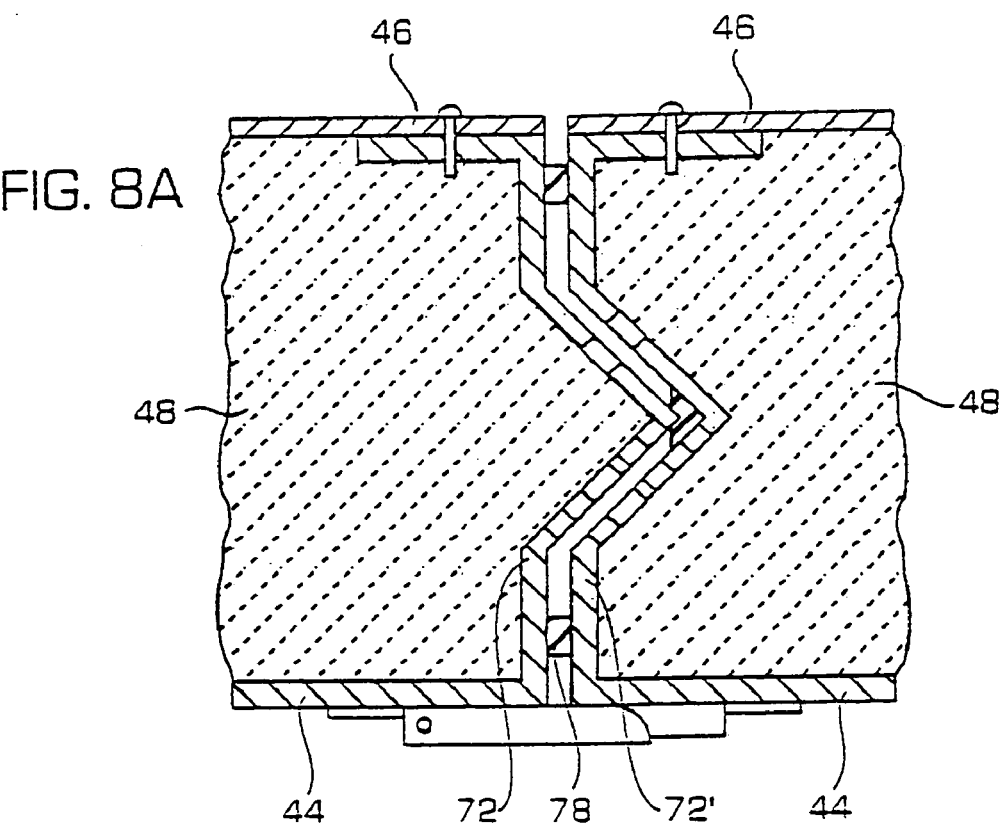

FIGS. 8A and 8B illustrate alternate embodiments of the present invention which feature male/female meshing edge segments which can be formed by subjecting the edge segments to alternate die configurations. As shown in each of FIGS. 8A and 8B, additional seal strips can also be added such as the V-shaped seal strip shown in FIG. 8A receiving the external edge of the male meshing edge segment. The embodiments of FIGS. 8A and 8B provide some degree of centering to facilitate initial assembly and enhanced sealing as well as some degree of added lateral stability and thus from that standpoint are more preferable to the embodiment of FIG. 7. The embodiments of FIGS. 8A and 8b are however less modular in nature and more difficult to manufacture, and thus, from that standpoint, are less desirable than the FIG. 7 arrangement.

The panels $P_A$ in FIG. 5, having, for example, the preferred 8 feet height, 2 feet width and 3 inch thickness, are interconnected in the illustrated embodiment (five in number) to provide, for example, two 10 feet length walls 90 and 92, which as explained below results in a 10 foot long internal oven chamber due to the end panels attachment over the exposed ends of the vertical side walls. To facilitate installation by helping properly align and maintain in position the walls 90 and 92 and to add stability after installation, edging corners 100 (only one shown in FIG. 5) are provided.

In a preferred embodiment, each panel assembly $P_A$ is exactly the same with the same orientation. For example, in the arrangement shown in FIG. 5 each of the five panels preferably has its sealing strips on a first (e.g., right) side edge segment and a clamp latch component 95 (e.g., a moving or pivoting latch component) on the adjacent facing's long edge. The opposite (e.g., left) panel edge panel is free of seals and has the non-moving latch component 97 of latch 94. Also, for roof panel mounts each of side wall panels $P_A$ is also preferably provided with a latch component 102 of the latching means 103 (FIG. 9) along an upper region for latching to an overlaid roof panel having the other half 105 of the latching assembly. If, rather than direct contact floor support, insulated floor panels are used, suitable bottom latching means can also be provided in the bottom region of the side wall panels (not shown).

FIG. 6 illustrates in greater detail edge segment strips 78–80 in an opposite side sealing arrangement with respect to the intermediate heat dissipation aperture region 76, and a similar strip arrangement (strips 86, 88) for the heat dissipation aperture region 82 of end cap 54.

Figure 9:
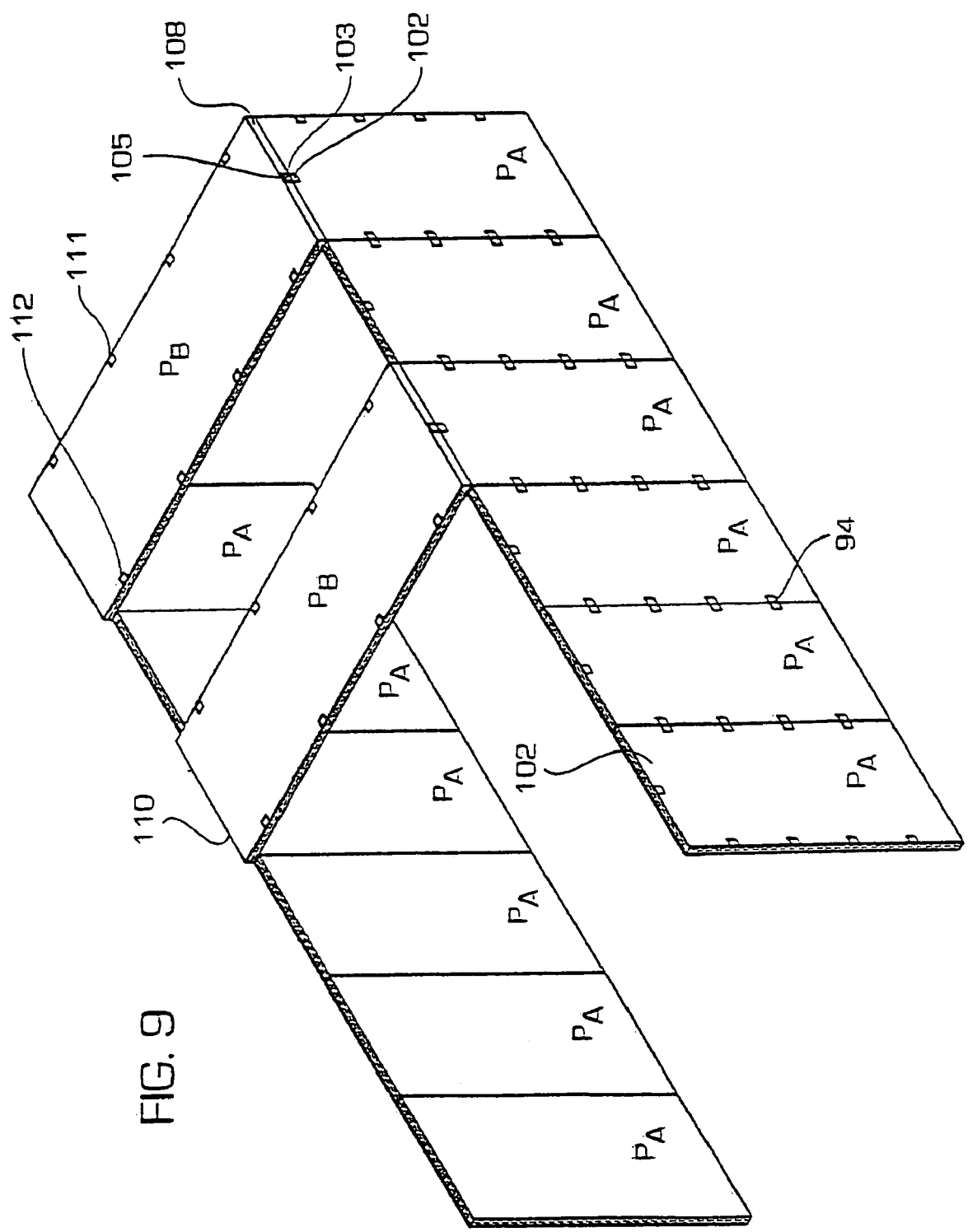
FIG. 9 shows the addition of two roof panel embodiments of the standardized panel assemblies of the present invention to the vertical side walls shown in FIG. 5.
Figure 10:
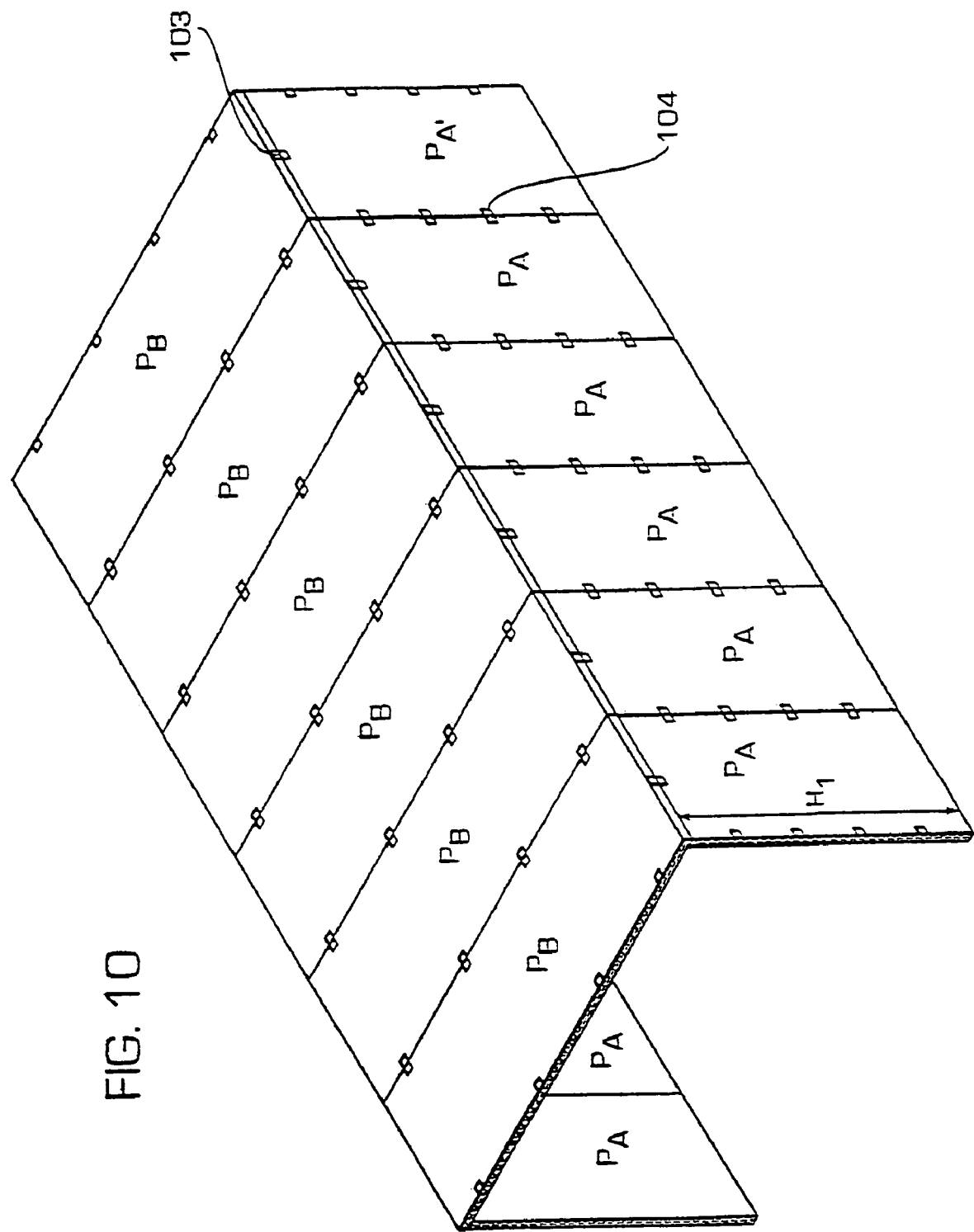
FIG. 10 shows the completion of the roof panel installation.

Upon completion of the two side wall panels, either the end panels or the roof panels can be next installed (or the end panels can be set up first and then the roof or side panels depending on the shape of the oven to be assembled). FIG. 9 illustrates, in perspective, initiation of the modular oven roof formation as the next assembly step while FIG. 10 shows the completion of the roof panel installation. While FIG. 10 shows five of the same type panels $P_B$ in a preferred embodiment one or more of the roof panels has cut-outs for the mounting of a heater-blower assemblies as well as exhaust port(s) or distribution port(s). Alternative heater/blower locations are also possible such as a side wall or end wall mount or even a remote location with the appropriate in-feed lines. Also in a preferred embodiment, the roof panels extend between and over the underlying tops of the vertical side walls 90 and 92 and are clamped in place by way of clamps 103 in similar fashion to the side wall clamping using clamps 94.

Figure 3:
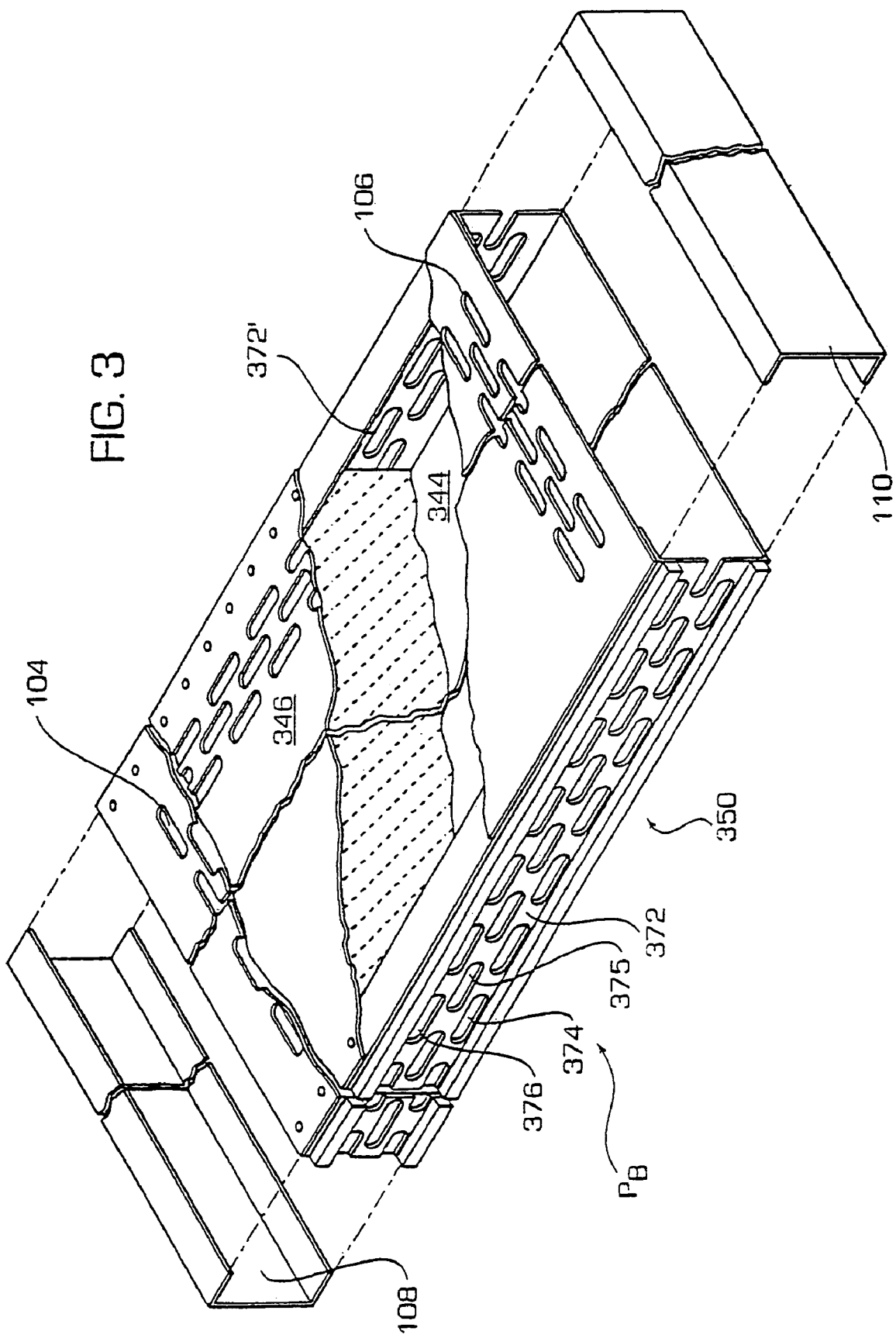
FIG. 3 shows a cut-away, partially exploded view of a second embodiment of the standardized panel assembly of the present invention, particularly well suited for oven roof construction.

As can be seen from FIGS. 3, 9 and 10, the roof panels are comprised of panel assemblies $P_B$, which correspond in width (e.g., 2 feet) and in thickness (e.g. 3 inches) with that of the basic side wall panels $P_A$. Panel assemblies $P_B$, which are shown in greatest detail in FIG. 3, have the same shell assembly 350 as in the earlier described shell assembly 50, but, in the illustrated embodiment, have a longer longside length so as to extend out over the tops of the side walls (e.g. in forming an 8 foot by 8 foot internal chamber cross-sectioned modular oven the roof panel shell assembly 50 has a length of 8 feet and 6 inches to provide the 8 feet of length plus coverage of the two 3 inch thick side walls). With the exception of a slight increase in length in the interior wall panel 344, the side edge segments 372 and 372' with the perforated regions 374, 375, 376 and interior plate 346 have the same construction as that shown in FIG. 1. The roof panels $P_B$ can be made of alternate lengths and widths to correspond with alternate modular oven designs, but the aforementioned size parameters are well suited for the modular nature of the present invention and for handling the internal load across the desired span and the possibility of added components and cut outs such as for a heater/blower unit. (Note for a preferred embodiment one or more separate smaller panel housing assemblies for supporting the heater blower unit is provided and preferably extends across the full long length of the roof panel and hence over the upper end of the vertical side walls to help distribute the weight of the heater blower unit to the vertical side walls). In addition to having longer shell lengths to accommodate extension over the upper edge of the side walls, an additional difference in shell assembly 350, as compared to shell assembly 50, can be seen in FIG. 3 and includes the inclusion of perforated regions 104 and 106 in inner shell section free ends of inner shell sections plate 346. The two end perforated regions 104 and 106 have a similar arrangement to the aforementioned perforated regions 82, 84 in the end caps in having three elongated offset series (like 374, 375, 376) of elongated heat dissipation holes which preferably cover about a two inch width. The perforated regions 104 and 106 extend for the full width of the plate 346 are essentially for the full length (e.g., an inch or two in from the free edge) such that the perforated regions 104 and 106 will coincide (at least in perforation side edge location) with the perforated regions 82 formed in the top of respective side wall panel assemblies $P_A$ of opposite side walls 90 and 92. In a preferred embodiment sealing strips are provided along the upper edge section of sidewall panels $P_A$ to sealingly internalize the perforated region 104 in the interior wall 346 of roof panels $P_B$. As noted above, alternate compression seal relationships are also possible.

The perforated regions 104 and 106 are provided in panel assemblies $P_B$ due to the use of non-perforated channel end caps 108 and 110 as shown in FIG. 3. The channel end caps 108 and 110 are made solid (and free of seal strips) as they represent external portions or surface areas of the modular oven being assembled as can be seen from FIGS. 9 and 10. Otherwise, however, end caps 108 and 110 are the same and arranged in the same fashion with respect to the shell assembly as end caps 52 and 54.

As shown in FIG. 9, each roof panel assembly $P_B$ features clamp component half member 105 provided on end caps 108 and 110 for achieving a roof panel-side wall attachment function via clamping means 103 in conjunction with clamping components 102 provided in the upper region of side wall panels $P_A$. Also, as shown in FIG. 9, each of roof panels $P_B$ are provided with similar clamping means as in side wall panels $P_A$ such as an arrangement involving pivotal-clamp components 111 and non-pivoting, reception clamp components 112. Each panel assembly is made exactly the same including the non-perforated end cap and perforated edge segment arrangements such as seal strips provided on one side edge segment and not on the other in a common panel $P_B$ (as the next in line panel would have a set). Thus, the roof assembly can be made rapidly and easily with little concern as to which roof panel is proper and without any special requirements or tooling with the completed roof being shown in FIG. 10. The few noted differences between side wall panels $P_A$ and roof panels $P_B$ also provides for ease in manufacturing.

Figure 11:
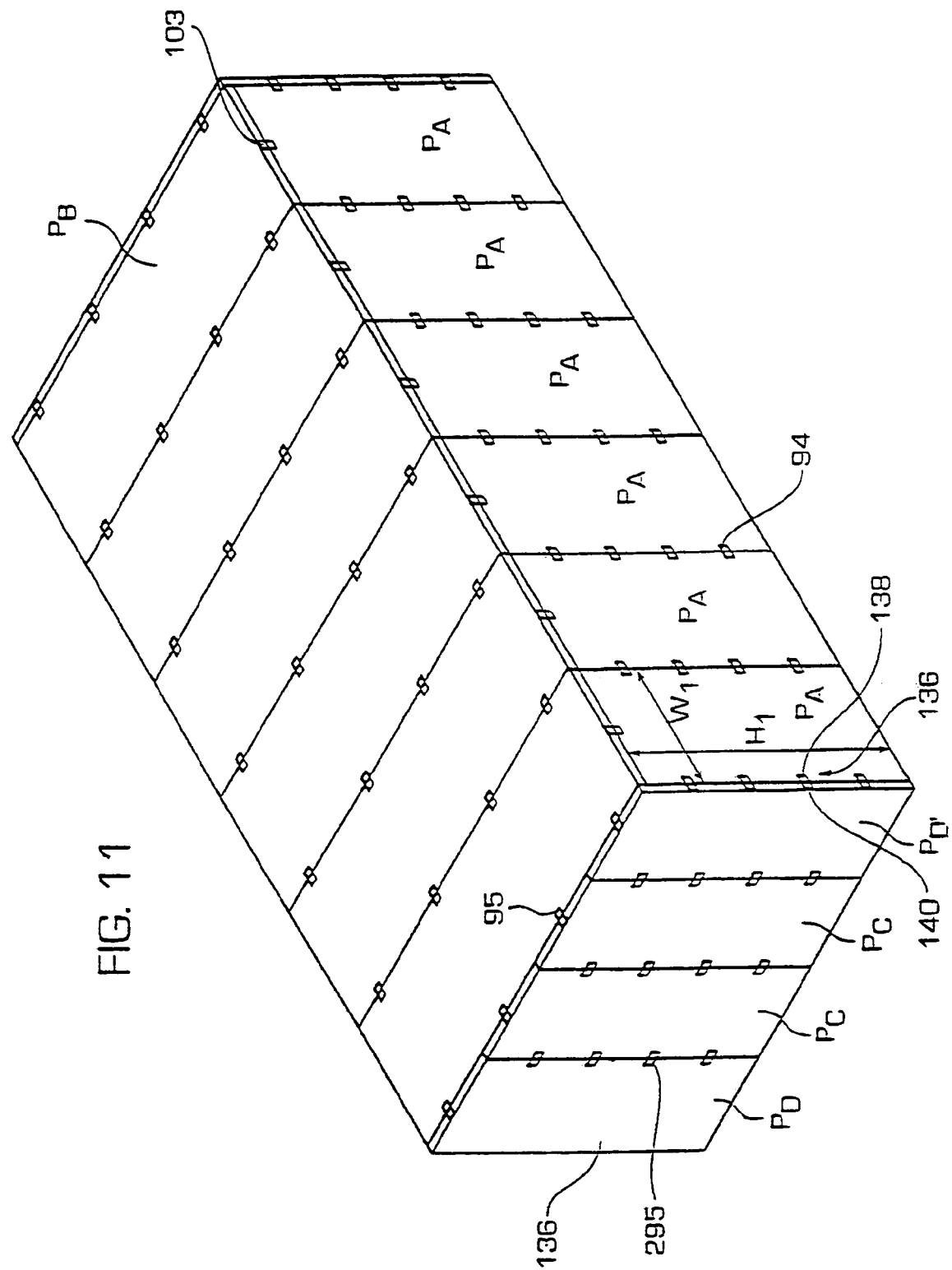
FIG. 11 shows the addition of end panel embodiments of the standardized panel assemblies of the present invention to the modular oven assembly.

FIG. 11 illustrates a subsequent stage in modular oven installation wherein the end walls have been added to the completed side wall and roof panel installations. The below description is made in regard to the earlier noted 8 foot×8 foot internal oven cross-section oven construction. With different desired oven widths, the number of end wall panels needed can be increased with only the length of the roof panels $P_B$ needing long side length adjustments (e.g., 8 feet to 12 feet) but again with the same structure. The same would be true for smaller width ovens (e.g., a 6 foot width) panel. An example of a width alteration (in this case an expansion rather than lessening) which can accommodate a certain conveyor pattern and provides for increased heat treatment to volume is described below with respect to FIG. 16.

In the embodiment illustrated in FIG. 11, the end walls are formed by two sets of vertical wall panel assemblies ($P_C$–$P_D$) and ($P_C$–$P'_D$) as described below and shown in FIG. 11. Panel assembly $P_C$ in the illustrated embodiment has the same arrangement as that of panel assembly $P_B$, including a preferred two foot width except that $P_C$ (in the illustrated embodiment) has a length that needs only extend past one (e.g., 3 inch thick) roof panel and not both side wall panel widths as with roof panel $P_B$ (e.g., $P_C$ with a long length of 8' 3" versus 8' 6" for the roof panels $P_B$).

Figure 4A:
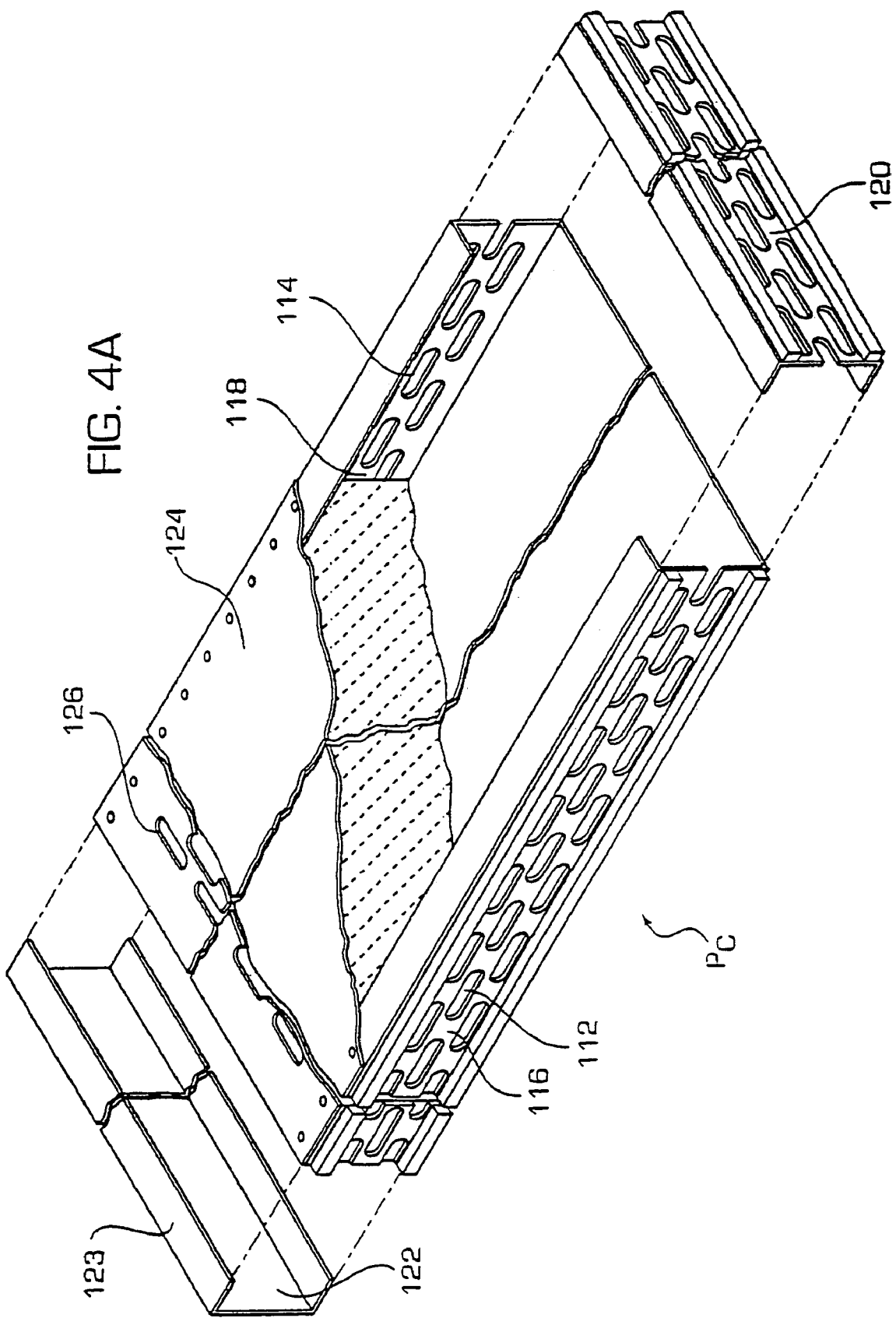
FIG. 4A shows a cut-away, partially exploded view of a third embodiment of the standardized panel assembly of the present invention particularly well suited for internal end wall construction.
Figure 4B:
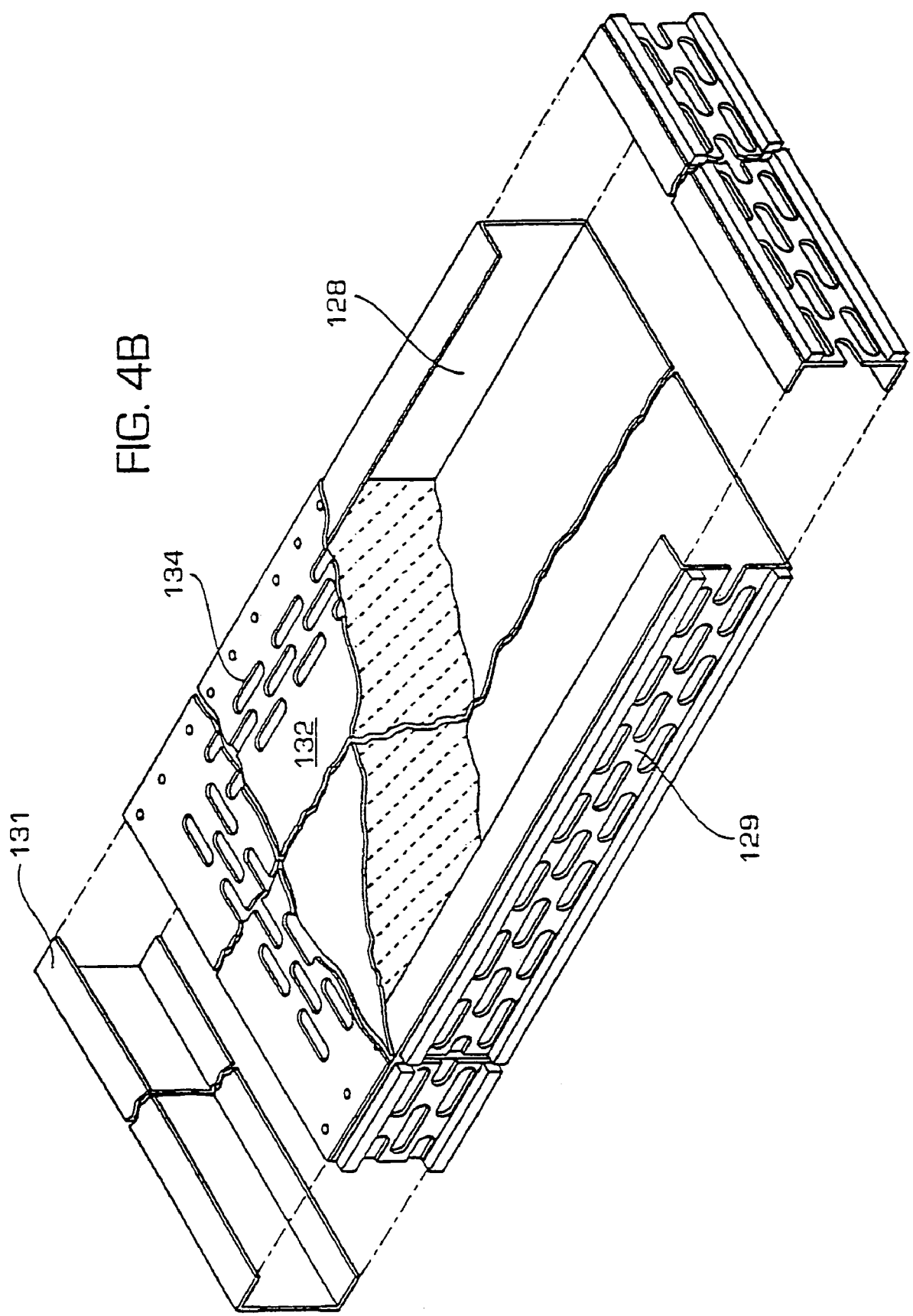
FIG. 4B shows a cut-away, partially exploded view of a fourth embodiment of the standardized panel assembly of the present invention particularly well suited for outer end wall construction.

As shown in FIG. 4A, each of panels $P_C$ includes perforation regions 112 and 114 along its long side edge sections 116 and 118 with preferably at least one of the perforated edge segments including a parallel seal strip combination as in the earlier embodiments. At one end (representing the bottom end upon modular oven installation) there is provided perforated channel end cap 120 (preferably with a seal strip set as shown) and at the opposite end there is provided non-perforated channel end cap 122 (representing an exposed, upper external section of the modular oven upon oven assembly). In inner shell plate 124 there is provided perforated region 126 positioned adjacent non-perforated end cap 122 and positioned so as to coincide with the opposing perforations of the long side portion of the roof panel $P_B$ to which the end panel assembly $P_C$ contacts. Flange 123 has a width generally commensurate with the distance perforated region 126 is inward of the free edge of interior wall 124 such that none or essentially none (e.g., only a portion of one) of the three aligned slots are covered) over. As with the earlier described panel assemblies, there is provided appropriate seal strips in the solid regions adjacent the perforated regions for which a corresponding region of an abutting panel does not already have a set of the parallel running seal strips. However, it is preferable to have a single continuous seal strip set in the exposed long side of the roof panel $P_B$ as opposed to a plurality of shorter length strip sets on each of panel assemblies $P_C$ and $P_D$. That is, while the inclusion of a parallel set of seal strips on opposite sides of perforated region 126 in inner panel section plate 124 can be provided, it is preferable to provide the sealing strip sets to the edge segments of roof panel $P_B$ abutting end panels $P_C$ so that they seal in the opposing perforated regions represented by perforated region 126 in $P_C$. Panel assembly $P_D$ in FIG. 4B is the same as $P_C$ except that rather than both long side edge sections having perforated regions, only one (i.e., side section 129) of the two long side edge sections has a perforated region. That is, as shown in FIG. 4B, long side edge section 128 is solid or non-perforated while long side section is perforated. The non-perforated edge section 128 forms a part of the external surface of the modular oven on the far side (not shown) in FIG. 11. As also shown in FIG. 4B, the top of panel assembly $P_D$ represented by end cap 131 is non-perforated while the opposite (floor end) end cap 133 is perforated. The long side of inner shell section plate 132 adjacent the non-perforated edge section 128 is provided with perforated region 134 in similar fashion to the other perforated regions described above to facilitate the dissipation of heat energy.

Panel $P_D^1$ is the same as panel $P_D$ except that the perforation/non-perforation arrangement is different from the standpoint of which side edge of the outer shell is perforated which is most easily achieved by having the perforated end cap 133 shown in FIG. 4B reversed in position with respect to non-perforated end-cap 131 such that upon abutment of the perforated end section of panel $P_D^1$ with an abutting more internal panel $P_C$, and the positioning of plate 132 internally in the modular oven, the upper end cap is non-perforated while the lower one is perforated. Thus, during assembly the same shell assembly is formed for each of $P_D$ and $P_D^1$ and the fastened end caps merely need to be switched in the final assembly steps.

As shown by FIG. 11, in addition to clamps 94 joining the five side walls together and clamps 103 for securing roof panels $P_B$ to side wall panels $P_A$, there is provided clamps 136 formed of clamp components 138 and 140 with one component of the clamping means supported on a side edge of the end panels $P_A$ of the side wall while the other component of the clamping means is supported on an end wall ($P_D$ or $P_D^1$) with the two components working together to clamp end panels $P_D$ and $P_D^1$ to a corresponding one of the side panels $P_A$. There is preferably an equal number of clamps 136 as that of clamps 94 with essentially equal spacing with those of 94 although panels $P_C$ are slightly longer in length than side panels 180. In similar fashion to each roof panel $P_B$ being secured to the top end of a side panel $P_A$ with one or more clamping means (one shown in FIG. 10 for each panel $P_A$ although a greater number of clamps can all be utilized for additional clamping function).

FIG. 11 further illustrates the clamping of end panels $P_C$ and $P_D$ ($P_D^1$) to the side of roof panel assemblies $P_B$ through use of clamping means 295.

Figure 12:
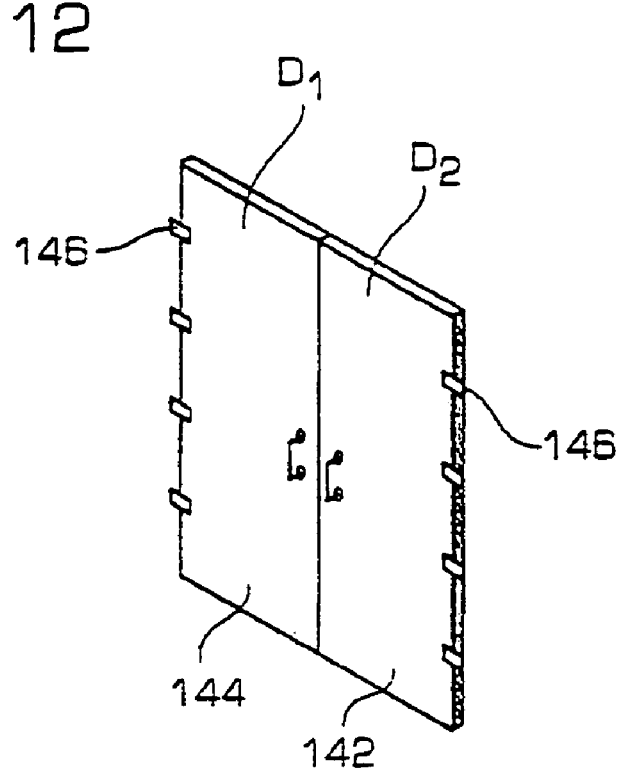
FIG. 12 shows a door set embodiment of a pair of standardized panels.
Figure 13:
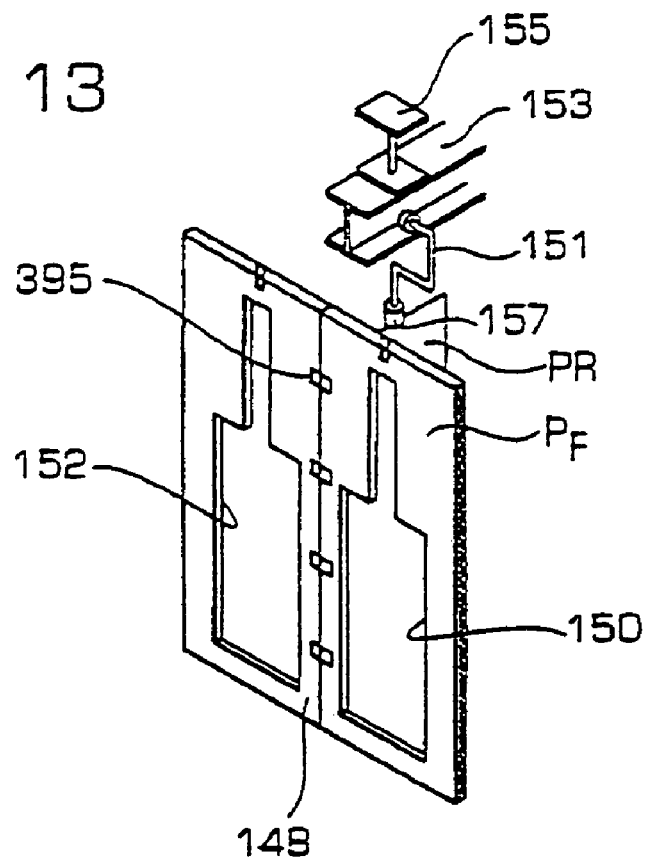
FIG. 13 shows a conveyor product-aperture arrangement formed in a standardized panel.

FIG. 12 shows a door assembly which is provided for an alternate embodiment of the invention wherein, for example, end panels PC and PC in FIG. 11 are replaced with the two door panels D1 and D2 which feature, rather than clamping means, hinge members 146, provided on the exterior side edge of each door panel. In an alternate embodiment, smaller size door panels or a single access door are supported internally within a border defined by one of the aforementioned panel assemblies. Suitable door latches or clamping members (not shown) are provided on the interior edge of the door panels (which is also the location for the perforated regions (e.g., 145 and seal strips). FIG. 13 shows a conveyor panel set $P_F$—$P_F$ with clamps 395 for use in supporting and conveying products PR being heat treated to and through a modular oven supporting roller hangers 151 supported on an I-beam 153 suspended below roof panels $P_B$ with suspension fasteners 157 holding product PR and internally and externally to the modular oven product opening(s). Accordingly, FIG. 13 provides an alternate panel design suited for passage therethrough of conveyor supported products to be heat processed within the modular oven. As shown in FIG. 13, a pair of panels $P_F$–$P_F^1$ are provided with each formed in similar fashion to the panel assemblies described above. Within the panel assemblies $P_F$–$P_F^1$) there is formed two conveyor product passageways 150 and 152 with the passageways being defined either by cut and bend sections of the inner and/or outer sections or by the addition of fitted cap channel members.

As shown by FIG. 13 in a preferred embodiment, roof panels $P_B$ are also provided with suspension fasteners 155 preferably in the form of I-beam clips which clamp against the upper web of an I-beam upon sliding an I beam within the slots defined by the spinning biased clips. These I-beam clips can be either fixed permanently to the underside of the roof panels or attached by way of, for example, a key slot block arrangement for receiving an upper plate segment of a clip fastener. Although not shown, an external conveyor system would link up with the internal conveyor track shown in FIG. 13 by extension through the narrower region of passageways 150 which also provides for roller hanger 151 travel. The larger opening 150, 152 provide for entry and/or exit of products depending upon the conveyor track arrangement.

Figure 14:
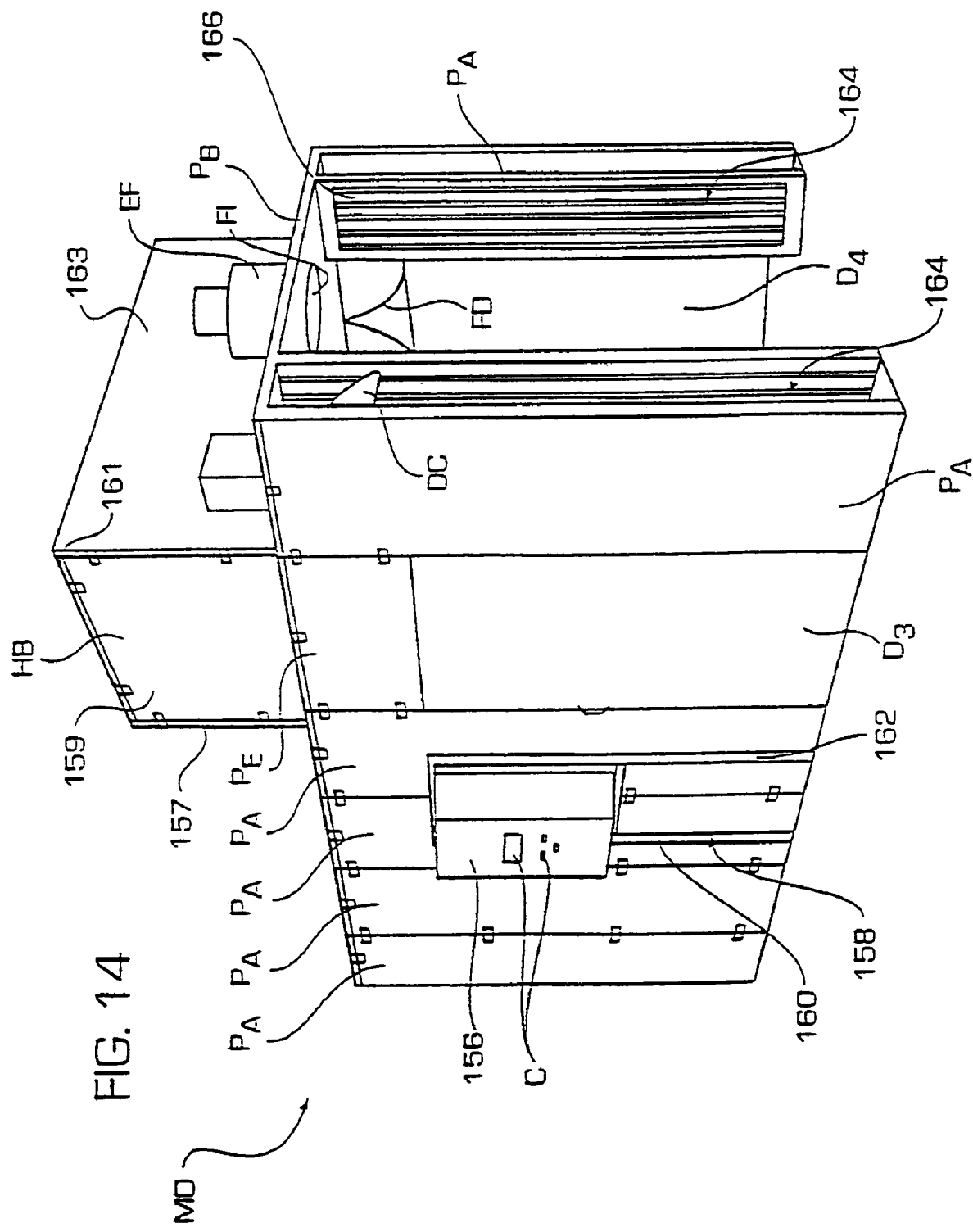
FIG. 14 shows a perspective view of an embodiment of a modular oven of the present invention with one end opened for illustrating internal oven features.

FIG. 14 illustrates another embodiment of a modular oven "MO" formed from a plurality of clamped together self supporting modular panel assemblies as described above for FIG. 11 and with one set of end panels removed so as to render visible the interior of the modular oven. In the embodiment shown in FIG. 14, doors $D_3$ and $D_4$ are provided on opposite sides of the oven which allows for either a solid panel end wall arrangement (not shown) or end walls with conveyor apertures or additional access doors.

In addition, FIG. 14 illustrates the inclusion of an above positioned heater and blower assembly HB which itself has a box like configuration made up of a plurality of side panels 159, a roof panel 161 and end panels 163.

As can be seen from FIG. 14, the heater-blower box HB can be readily formed using a roof panel 161 having the same structure as roof panel $P_B$ and with side panels 159 formed similar to panels $P_A$ in that they are covered on the top by roof panel 161 and of their side edges by end panels 163. End panels 163 are represented by panels having the same configuration as panel $P_D$ only with both of its end cap channels non perforated and with corresponding perforated interior plate areas (although the heat level is much lower in the HB assembly). Side panels 159 can be, for example equivalent to a single panel $P_A$ only cut in half and provided with two extra channels to provide two complete half panels $P_A$.

Heater Blower box HB is comprised of a blower (not shown) to recirculate heated air and a burner to facilitate the heating of that air. Heater blower box HB is thus provided with panels provided with appropriate air intake and heater and blower supports and vents or passageways. The box-like heater blower assembly HB is supported by one or more of the roof panels $P_B$ which in turn have appropriate air feed passageways for feeding heated air to the duct system of the oven, with a preferred embodiment of the duct assembly described below. The box like heater and blower assembly HB is also latched down through use of clamping means 357 such that the seal components of the heater-blower HB are compressed against the upper surface of the supporting roof panel(s). Also, with respect to shell assemblies like those described above, a variety of alternate side, end and roof edge abutment arrangements are possible with the important thing being that the exposed edge sections of the box-like structure that are non-perforated or the capped end channels that are non-perforated are provided with appropriate inner shell section perforation regions to correspond with the abutting perforated edge section of an adjacent wall. The above described shell assembly arrangement are preferred however in their ease of assembly and overall structural integrity.

As noted above, the modular oven embodiment MO in FIG. 14 further includes a modified side door walk-in arrangement featuring door D3 which has the side to side dimensions of a single panel assembly $P_A$, but a shorter height. Positioned above the standard size door $D_3$ is a fill in panel $P_E$ which again is formed in similar fashion as a panel assembly such as $P_A$, but again on a smaller scale. As shown in FIG. 14 another optional door D4 is provided on the opposite vertical wall for the modular oven shown in FIG. 14 and a corresponding fill in panel. As the door region is free of heated air perforated plate ducting assemblies, a flow divider FD is provided to feed the perforated duct-panel assemblies (represented by FIG. 15 and discussed below) with heated air supplied through an above positioned roof panel opening underlying box HB. In addition, for exhausting the heated air an exhaust fan assembly EF is supported on another roof panel $P_B$ having fan intake conduct FI formed thereon. An additional difference between the modular oven embodiment in FIG. 14 and the modular oven shell shown in FIG. 11, lies in the expansion in the length of the shell by one added panel (which can be considered the side door panel/filler panel combination) such that the oven length is 12 feet, for example, as opposed to 10 feet for the earlier embodiment.

Figure 15:
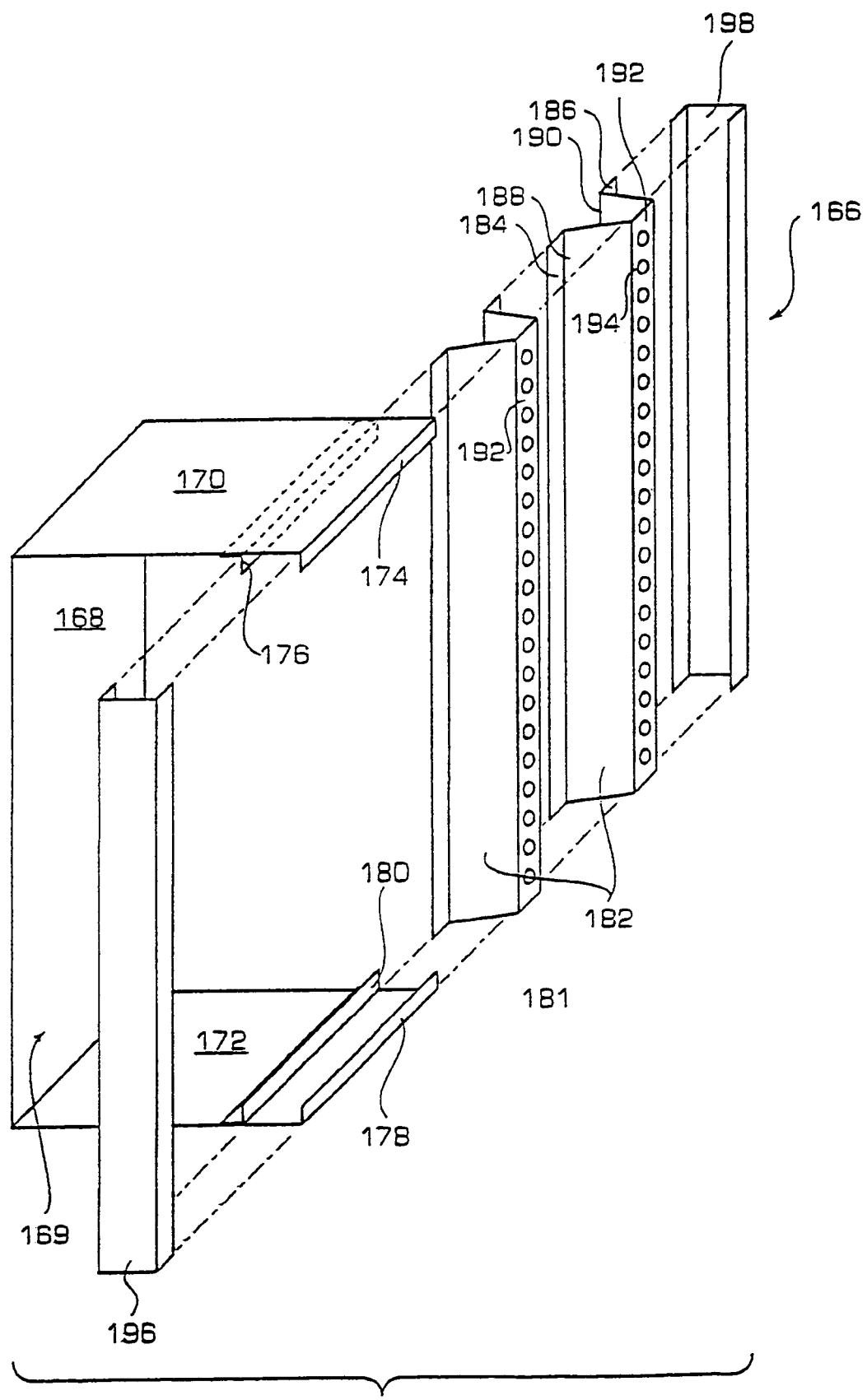
FIG. 15 shows an exploded view of a ducting assembly of the present invention.

FIG. 14 further illustrates control system 156 mounted, in this embodiment, on support framework 158 having opposing ground contact legs 160, 162 which are secured to the outer surface of adjacent panel assemblies. Control system 156 includes control panel C for adjustments/visualization in the heater/blower assembly settings and a conveyor system (not shown), if applicable. From the internal view of the modular oven in FIG. 14, there can also be seen duct system 164 of the present invention which includes duct assembly 166 best seen in the exploded view of FIG. 15. Duct assembly 166 is preferably sectionally designed to correspond to an individual side panel assembly $P_A$ such that modular panel alteration can easily be carried out without disrupting the remainder of the duct panel system that preferably provides securement support for it, although under the present invention a non-securement/abutment relationship is also possible. In FIG. 15, duct assembly 166 is designed to match with the supporting interior wall plate 46 and features main body 169 having an elongated vertical back wall 168 which has an upper duct section 170 extending transversely off the upper end of the vertical back wall 168 and a corresponding lower duct section 172. Attached at the free end of upper duct section 170 is outer channel strip 174 and at a more intermediate location there is provided inner channel strip 176. Channel strips 174 and 176 face corresponding lower duct section channel strips 178 and 180. The corresponding channels strips provide containing slide tracks for duct nozzle plating sheets 182 which are preferably individually formed plates with two rear flange extensions 184 and 186 bordering a central protruded section having two inwardly sloped wall sections 188, 190, which, in turn, border nozzle section 192 having a series of nozzle outlets 194. As seen from FIG. 15 duct nozzle plating 181 preferably comes in lengths shorter than the length of the channel tracks formed by the channel strips. For example, for a two foot length width rear wall 168, two one foot duct nozzle plating sheets are provided to fill in the entire length of the track formed by the channel strips. Alternatively, the two plating sheets 182 can be made slightly larger to provide a degree of overlap at the flanges, or of equal width as rear wall 168. The peak height of the protruded central section (i.e., the spacing between a first plane lying flush on the flange extensions and a second plane lying flush on the nozzle section 192) is spaced essentially the same degree as the channel strips such as 178 and 180. In this way, the channel strips frictionally retain the duct nozzle plating in position following their sliding in place into a side-by-side arrangement. The tracks formed by the channel strip pairs 174–176 and 178–180 and the space between them are then closed off by ducting caps 194 and 196 which are channel shaped members that are secured to the upper and lower strip pairs. The ducting caps 196 and 198 are preferably placed in a flush relationship with respect to the inner shell plate 46 of an adjacent panel assembly 30 (when at the ends of a sidewall) or in ducting cap to ducting cap abutment when positioned more internal along the side wall. To help dissipate the flow internal distribution channel duct work DC (FIG. 14) can be installed in accordance with present invention within the upper region of the plenum region between rear wall 168 and plates 182. Instead of the end caps being placed in a side-by-side abutting relationship, the internally positioned duct nozzle plating can be free of end capping with preferably overlapping flange extensions 184, 186.

FIG. 14 shows the interior of the modular oven MO with a plurality of ducting assemblies (e.g. with a preferred two foot width for the ducting assembly 166 corresponding to the preferred two foot width for the panel assemblies $P_A$). Rather than a substantially 2 to 1 correspondence between duct nozzle plating 181 and panel $P_A$ and one-to-one correspondence between the ducting main body 169 width and panel $P_A$ width, other ratios are also possible, including, for example, 0.5/1 or 1/1 for the ducting plates 181, although the first noted ratios are easy to manufacture and east to assemble, and readily conformable to a variety of modular oven configurations. In MO there is shown five ducting assemblies (each with two plate sections 182) for the 12 foot length oven represented in FIG. 14 corresponding to the side wall panels $P_A$ to each side of the side door ($D_3$ or $D_4$). If a situation arises wherein instead of a 12 foot oven batch size (e.g., a drying or baking heat treatment process) a larger batch size is desired requiring a 24 foot length oven interior, then the modular oven shown in FIG. 14 can be easily expanded simply by removing one of the two end wall sets and adding on the same panels used in FIG. 14 in mirror image relationship. To accommodate for the added volume another heater blower box HB would be provided in the central region of the roof of the added sub-shell assembly.

FIG. 16 shows still additional embodiment of the modular oven of the present invention with FIG. 16 showing the use of standard wall panels and roof $P_A$, $P_B$ in the formation of an expanded volume L-shaped modular oven together with a throughput conveyor apparatus and end panels having reception holes for passage of products being subjected to heat treatment or the like. The embodiment shown in FIG. 16 features two oven blocks with one (X1) and the other (X2) being combined along an entirely open common wall border or one with additional conveyor panel inserts on one of the two oven blocks as provided at the ends. In some heating processing situations, a prolonged period of internal travel is desirable from the time of product conveyor entry into a modular oven to the time of exiting. FIG. 16 illustrates one embodiment for expanding the oven volume while also providing additional conveyor length time period extension. By providing a conveyor entry and exiting aperture panel at one leg end and a sinusoidal conveyor track internally within the modular oven, an extended length travel time is provided for achieving an extension of conveyor time within a relatively small volume oven. Additional internal travel time can also be easily provided under the present invention by, for example, extending the length of block X1 through use of additional roof panels $P_B$ or, for example, using a larger length roof panel $P_B$ (e.g., a 12 foot long $P_B$), and adding a sinusoidal pattern to the track within block X1.

The foregoing just represents a few examples of the flexibility accorded by the above described modular configuration of the modular component making up the present invention. In using, for example, a standardized arrangement for the end wall panels, roof panels and side wall panels such as panels with a 2 foot width, 3 inch side and edge and at least common subset lengths of, for example, 8 feet height or long length manufacturing and assembly is greater simplified by way of the modular nature of the panels.

Additional advantages and modifications will readily occur to those skilled in the art. Therefore, the invention in its broader aspects is not limited to the specific details representative devices shown and described herein. Accordingly, various modifications may be made without departing from the spirit or scope of the general inventive concept as defined by the appended claims and their equivalents.

As just one example, larger root panels (e.g., $12^1$ longside span) can be utilized in conjunction with standard end and side wall panels (e.g., 6 end wall panels at about $2^1$ width and 9 side wall panels at $2^1$ width providing an 8 foot height, a 12 foot width and an 18 foot length).

We claim:

1. A modular oven wall panel comprising: an outer shell section having, as a monolithic body, an outer wall section, two opposite side edge panel segments extending from respect edge lines of said outer wall section, and two opposite side flange members extending inwardly toward one another from said edge segments at a location spaced from said outer wall section, and an inner shell section comprising an inner wall plate in contact with said flanges and wherein said oven wall panel is of a material of sufficient strength and thickness as to be self-supporting as an oven wall panel without associated structural support; said modular oven wall panel further comprising first and second end caps received by said outer shell section and positioned at opposite ends of said outer shell section, and wherein said first and second end caps include an end cap formed with heat dissipation apertures and an end cap formed free of dissipation apertures.

2. A modular oven wall panel as recited in claim 1 wherein said inner shell section is provided with at least one heat dissipation aperture region which is positioned in juxtaposition to the end cap which is free of heat dissipation apertures so as to provide a heat dissipation function not provided by the end cap free of heat dissipation apertures.

3. A modular oven wall panel as recited in claim 1 wherein a pair of sealing strips are positioned to opposite sides of said heat dissipation apertures.

4. A modular oven wall panel comprising: an outer shell section having, as a monolithic body, an outer wall section, two opposite side edge panel segments extending from respect edge lines of said outer wall section, and two opposite side flange members extending inwardly toward one another from said edge segments at a location spaced from said outer wall section, and an inner shell section comprising an inner wall plate in contact with said flanges and wherein said oven wall panel is of a material of sufficient strength and thickness as to be self-supporting as an oven wall panel without associated structural support; and a ducting system having a duct assembly internal of said wall panel shell section and designed for separation relative to an adjacent side wall panel without disrupting a remaining portion of said ducting system.

5. A modular oven wall panel as recited in claim 4 wherein one or both of said outer shell section and said inner shell section comprises heat dissipation means; and said modular oven wall panel further comprising sealing means for avoiding leakage of heat from said heat dissipation means and a clamp for clamping adjacent shell assemblies together.

6. A modular oven wall panel comprising: an outer shell section having, as a monolithic body, an outer wall section, two opposite side edge panel segments extending from respect edge lines of said outer wall section, and two opposite side flange members extending inwardly toward one another from said edge segments at a location spaced from said outer wall section, and an inner shell section comprising an inner wall plate in contact with said flanges and wherein said oven wall panel is of a material of sufficient strength and thickness as to be self-supporting as an oven wall panel without associated structural support, and wherein one or both of said outer shell section and said inner shell section comprises heat dissipation means and said oven wall panel further comprising sealing means for avoiding leakage of heat from said heat dissipation means and a clamp for clamping adjacent shell assemblies together.

7. A modular oven wall panel as recited in claim 6 wherein said edge segments are perpendicular to said outer wall section and said flange members are parallel to said outer wall section and said inner wall plate is secured to said flange members so as to extend parallel with said outer wall panel.

8. A modular oven wall panel as recited in claim 6 further comprising a first end cap received by a first end of said outer shell section and a second end cap received by a second end of said outer shell section.

9. A modular oven wall panel as recited in claim 8 wherein one of said first and second end caps include includes an end cap formed with heat dissipation apertures.

10. A modular oven wall panel as recited in claim 6 further comprising a first end cap received by a first end of said outer shell section and a second end cap received by a second end of said outer shell section, wherein both of said inner and outer wall sections include heat dissipation means, and wherein at least one of said first and second end caps is free of heat dissipation means.

11. A modular oven wall panel as recited in claim 10 wherein both of said first and second end caps are free of heat dissipation means.

12. A modular oven wall panel as recited in claim 6 further comprising a first end cap received by a first end of said outer shell section and a second end cap received by a second end of said outer shell section, wherein said inner shell section is free of heat dissipation means and said outer shell section inclusive of heat dissipation means, and wherein each of said first and second end caps include heat dissipation means.

13. A modular oven wall panel comprising:

an outer shell section having, as a monolithic body, an outer wall section, two opposite side edge panel segments extending from respect edge lines of said outer wall section, and two opposite side flange members extending inwardly toward one another from said edge segments at a location spaced from said outer wall section;

an inner shell section comprising an inner wall plate in contact with said flanges, and wherein said oven wall panel is of a material of sufficient strength and thickness as to be self-supporting as an oven wall panel without associated structural support;

thermal insulation within the outer shell section;

heat dissipation means associated with at least one of the outer wall section and said inner wall plate to permit heat entering the outer wall section to communicate with an adjacent wall panel;

and means for releasably interconnecting said wall panel to an adjacent panel.

14. A modular oven wall panel as recited in claim 13 further comprising first and second end caps received by said outer shell section and positioned at opposite ends of said outer shell section.

15. A modular oven wall panel as recited in claim 14 further comprising a heat insulation member which is confined within an internal region defined by said outer shell section and said first and second end caps, and said insulation member represents a sole panel component within said internal region.

16. A modular oven wall panel as recited in claim 15 wherein said insulation member is an insulation pad which essentially completely fills in said internal region of said outer shell section.

17. A modular oven wall panel as recited in claim 13 further comprising a sealing strip supported by said outer shell section.

18. A modular oven wall panel as recited in claim 13 wherein the heat dissipation means includes apertures.

19. A modular oven wall panel as recited in claim 13 further comprising sealing means positioned on said oven wall panel such that said sealing means is compressed upon said means for releasably interconnecting being placed in a connecting state with the adjacent panel being interconnected.

* * * * *